United States Patent [19]
Yasuda et al.

[11] Patent Number: 6,070,212
[45] Date of Patent: May 30, 2000

[54] BUS ARBITER OPERABLE AS A DRAM CONTROLLER

[75] Inventors: Midori Yasuda, Yokohama, Japan; Masashi Kamada, Irvine, Calif.; Takayuki Ninomiya, Ichikawa; Kazuhiko Morimura, Yokohama, both of Japan

[73] Assignee: Canon Kabushiki Kaisha, Tokyo, Japan

[21] Appl. No.: 08/996,317

[22] Filed: Dec. 22, 1997

[30] Foreign Application Priority Data

Dec. 26, 1996 [JP] Japan .................................... 8-356504

[51] Int. Cl.[7] .................................................. G06F 13/00
[52] U.S. Cl. ............................. 710/107; 710/22; 710/26; 710/28; 710/240; 711/106
[58] Field of Search .................................... 711/106, 105, 711/100, 154; 710/36, 22, 26, 28, 107, 240

[56] References Cited

U.S. PATENT DOCUMENTS

| | | | |
|---|---|---|---|
| 4,292,668 | 9/1981 | Miller et al. ................................. | 364/200 |
| 5,129,073 | 7/1992 | Murakami et al. ......................... | 711/105 |
| 5,265,231 | 11/1993 | Nuwayser ................................... | 711/106 |
| 5,317,709 | 5/1994 | Sugimoto ................................... | 711/105 |
| 5,345,577 | 9/1994 | Chan et al. ................................. | 711/106 |
| 5,349,647 | 9/1994 | Freiburg et al. ........................... | 395/115 |
| 5,418,920 | 5/1995 | Kuddes ....................................... | 711/106 |
| 5,440,711 | 8/1995 | Sugimoto ................................... | 711/106 |
| 5,467,295 | 11/1995 | Young et al. ............................... | 395/200 |
| 5,638,529 | 6/1997 | Yee et al. ................................... | 711/106 |
| 5,682,498 | 10/1997 | Harness ...................................... | 711/106 |

OTHER PUBLICATIONS

"Bus Request Update Mechanism to Improve Processor Performance", IBM Technical Procedure Billetin, vol. 38, No. 8, Aug. 1, 1995, pp. 261–263.

*Primary Examiner*—Xuan M. Thai
*Attorney, Agent, or Firm*—Fitzpatrick, Cella, Harper & Scinto

[57] ABSTRACT

A bus arbiter capable of avoiding needless increase in circuit scale is provided. The bus arbiter controls a bus shared by a CPU (central processing unit) and a plurality of apparatuses for generating addresses. The bus arbiter includes a determination unit for determining if a request of an address is a request of an address where no corresponding device is present, and a processor for passing the request by transmitting an ACK signal without performing a writing operation for a request of a writing operation, and transmitting dummy data and an ACK signal without performing a reading operation for a request of a reading operation, when the determination unit has determined that the request is a request of an address where no corresponding device is present.

7 Claims, 26 Drawing Sheets

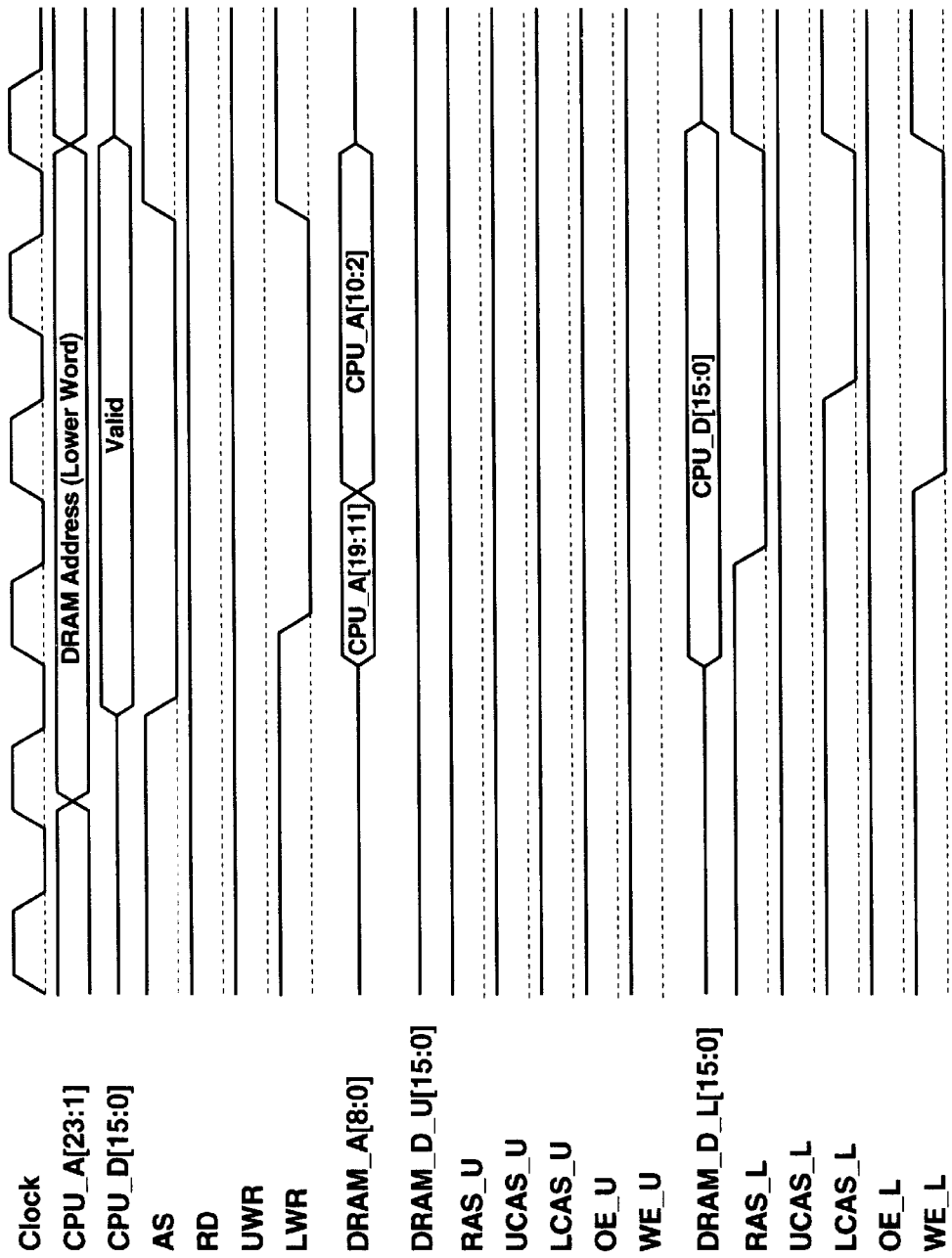

BUS ARBITER OPERABLE AS A DRAM CONTROLLER

BACKGROUND OF THE INVENTION

1. Field of the Invention

The present invention relates to a bus arbiter.

2. Description of the Related Art

In a first example of a conventional bus arbiter, since the bus arbiter does not normally operate for a request to write in/read from an address for which a corresponding device is absent, an apparatus for generating an address has the function of prohibiting a request to write in/read from an address outside a set address region, for example, by referring to an address map within the system.

In a second example of a conventional bus arbiter also operating as a DRAM (dynamic random access memory) controller as shown in FIG. 13, the system is controlled by a CPU 300 having a data-bus width of 16 bits, and programs to be executed by the CPU 300 are stored in a ROM (read-only memory) 400. A bus arbiter 500 also operating as a DRAM controller arbitrates accesses of the CPU 300 and a DMA (direct memory access) controller 800 to DRAM's 600 and 700. Each of the DRAM's 600 and 700 has a capacity of 4M bits and a data bus width of 16 bits. The DRAM's 600 and 700 store upper words and lower words, respectively. The DMA controller 800 has a data bus width of 32 bits.

There are shown signals 311–338 between respective blocks. Reference numeral 311 represents a chip select signal ROMCS for the ROM 400. Reference numeral 312 represents a CPU data bus CPU_D [15:0] having a bus width of 16 bits. Reference numeral 313 represents a CPU address bus CPU_A [23:1] having a bus width of 23 bits. Reference numerals 314, 315, 316, 317, 318, 319, and 320 represent a reset signal Reset, a system clock signal Clock, an address strobe signal AS, a read signal RD, an upper-byte write signal UWR, a lower-byte write signal LWR, and a wait signal Wait, respectively.

Reference numeral 321 represents a DRAM address bus DRAM_A [8:0] having a bus width of 9 bits. Reference numeral 322 represents an upper-word DRAM data bus DRAM_D_U [15:0] having a bus width of 16 bits. Reference numerals 323, 324, 325, 326, and 327 represent an upper-word DRAM row-address strobe signal RAS_U, an upper-word DRAM upper-byte column-address strobe signal UCAS_U, an upper-word DRAM lower-byte column-address strobe signal LCAS_U, an upper-word DRAM write signal WE_U, and an upper-word DRAM read signal OE_U, respectively.

Reference numeral 328 represents a lower-word DRAM data bus DRAM_D_L having a bus width of 16 bits. Reference numerals 329, 330, 331, 332, and 333 represent a lower-word DRAM row-address strobe signal RAS_L, a lower-word DRAM upper-byte column-address strobe signal UCAS_L, a lower-word DRAM lower-byte column-address strobe signal LCAS_L, a lower-word DRAM write signal WE_L, and a lower-word DRAM read signal OE_L, respectively.

Reference numeral 334 represents a DMA data bus DMA_D [31:0] having a bus width of 32 bits. Reference numeral 335 represents a DMA address bus DMA A [23:2] having a bus width of 22 bits. Reference numerals 336, 337, and 338 represent a DMA request signal DMA_Req, a DMA direction signal DMA_Dir, and a DMA acknowledge signal DMA_Ack, respectively.

A signal CPU_A [0] is absent on the CPU address bus CPU_A [23:1], because the CPU 300 has the upper-byte write signal UWR and the lower-byte write signal LWR, and therefore address assignment in units of a byte is unnecessary. A signal DMA_A [1:0] is absent on the DMA address bus DMA_A [23:2], because in this case, the data width of the DMA controller 800 is 32 bits, and therefore address assignment in units of a byte and in units of a word is unnecessary. The DRAM address bus DRAM_A[8:0] comprises only 9 bits, because in this case, the row address and the column address of the DRAM each comprise 9 bits.

FIG. 14 is an address map for the units shown in FIG. 13. The address space of the CPU 300 comprises 0H—FFFFFFH, i.e., 16 M bytes. The addresses 0H—7FFFFFH and 800000H—8FFFFFH are allocated to the ROM 400 and to the RAM's 600 and 700, respectively. The address 900000H and the succeeding addresses are allocated to a register of the DMA controller 800, an input/output register (not shown in FIG. 3), and an internal register of the CPU 300.

The CPU 300 executes processing in accordance with a program stored in the ROM 400, and accesses the ROM 400 by the signal ROMCS and by bits between the 22nd bit and the 1st bit on the bus CPU_A [23:1]. Accesses from the CPU 300 and the DMA controller 800 to the DRAM's 600 and 700 are performed via the bus arbiter and DRAM controller 500.

FIG. 15 is a flowchart illustrating the operation of the bus arbiter and DRAM controller 500 during an access by the CPU 300. If the CPU 300 accesses the region of the ROM 400, and an access from the DMA controller 800 is absent, i.e., if the CPU_A [23:1] indicates 0H—7FFFFFH indicating the region of the ROM, and the DMA or the DMA_Req is not asserted, as results of determination in steps S101 and S102, then, in step S103, CAS-Before-RAS refreshing as shown in the timing chart of FIG. 16 is performed. More specifically, the signals UCAS_U, LCAS_U, UCAS_L and LCAS_L are asserted, and then, the signals RAS_U and RAS_L are asserted.

As described above, the bus arbiter and DRAM controller 500 has a CAS-Before-RAS refreshing function. Usually, the DRAM is required to be refreshed at a frequency equal to or greater than a specified time interval. Hence, the refreshing time interval is monitored by a timer. If the next refreshing operation is not generated for a predetermined time period after a refreshing operation, a refreshing operation is performed by forcedly interrupting the operation of the CPU 300.

Processing from step S104 to step S137 is an access to the RAM region. Accordingly, in step S104, it is determined if an address between 800000H and 8FFFFFH of the RAM region is indicated. If the result of the determination in step S104 is affirmative, the process proceeds to step S105, where a signal CPU_A [19:10] is output to the bus DRAM_A [8:0] as a row address. Then, in step S106, the fall of a clock pulse is detected. In step S107, it is determined whether a signal CPU_A[1] is 0 or 1, i.e., whether the DRAM 600 for upper words or the DRAM 700 for lower words is to be accessed. If the DRAM 600 is to be accessed, then, in step S108, the signal RAS_U is asserted. If the DRAM 700 is to be accessed, the signal RAS_L is asserted.

Then, in step S110 or step S111, the rise of a clock pulse is detected. Then, in step S112 or step S113, it is determined whether a reading operation or a writing operation is to be performed. In the case of a reading operation, the signal OE_U is asserted in step S116 in the case of an upper word, and the signal OE_L is asserted in step S117 in the case of a lower word.

In the case of a writing operation, the signal WE_L is asserted in step S116 in the case of an upper word, and the signal WE_L is asserted in step s117 in the case of a lower word. Then, in step S118 or step S119, a signal CPU_A [9:2] is output to the bus DRAM_A [8:0] as a column address.

Then, in step S120 or S121, the rise of a clock pulse is detected. In step S122 or step S123, it is determined if a reading operation is to be performed. In the case of a reading operation, the signal UCAS_U or LCAS_U is asserted in step S124 in the case of an upper word, and the signal UCAS_L or LCAS_L is asserted in step S125 in the case of a lower word.

If a reading operation is not be performed, then, in step S126 or S127, it is determined if an operation to write an upper byte is to be performed. In the case of an operation to write an upper byte, the signal UCAS_U is asserted in step S128 in the case of an upper word, and the signal UCAS_L is asserted in step S129 in the case of a lower word.

Similarly, in step S130 or S131, it is determined if an operation to write a lower byte is to be performed. In the case of an operation to write a lower byte, the signal LCAS_U is asserted in step S132 in the case of an upper word, and the signal LCAS_L is asserted in step S133 in the case of a lower word.

Then, in steps S134—S136, the rise, the fall and the rise of clock pulses are detected, respectively. Finally, in step S137, all of the signals RAS_U, RAS_L, UCAS_U, LCAS_U, UCAS_L, LCAS_L, OE_U, OE_L, WE_U, and WE_L are negated, and the series of processing is terminated.

FIG. 17 is a timing chart illustrating the accessing of the DRAM's 600 and 700 from the DMA controller 800, in the case of reading a long word. The DMA controller 800 sets the signals DMA_A [23:2] and DMA_Dir for the bus arbiter and DRAM controller 500, and then outputs the signal DMA_Req. When the upper 4-bit DMA_A [23:2] of the DMA_A [23:2] is 8 H, i.e., an address indicating the DRAM, the bus arbiter and DRAM controller 500 outputs the signals RAS_U, UCAS_U, LCAS_U, OE_U, RAS_L, UCAS_L, LCAS_L and OE_L to cause the DRAM's 600 and 700 to output the signals DRAM_D_U [15:0] and DRAM_D_L [15:0], outputs the signals DRAM_D_U [15:0] and DRAM_D_L [15:0] as signals DMA_D [31:16] and DMA_D [15:0], respectively, to the DMA controller 800, and, at the same time, transmits the signal DMA_Ack to the DMA controller 800.

In the case of an operation to write a long word, shown in FIG. 18, the DMA controller 800 sets signals DMA_A [23:2], DMA_D [31:0] and DMA_Dir for the bus arbiter and DRAM controller 500, and then outputs the signal DMA_Req. When the upper bit DMA_A [23:21] of the DMA_A [23:2] is 8 H, i.e., an address indicating the DRAM, the bus arbiter and DRAM controller 500 outputs the signals RAS_U, UCAS_U, LCAS_U, WE_U, RAS_L, UCAS_L, LCAS_L and WE_L, outputs signals DMA_D [31:16] and DMA_D [15:0] to the buses DRAM_D_U [15:0] and DRAM_D_L [15:0], respectively, and, at the same time, transmits the signal DMA_Ack to the DMA controller 800.

FIG. 19 is a timing chart for when the CPU 300 accesses the DRAM's 600 and 700, which corresponds to the flow-chart shown in FIG. 15.

FIGS. 19, 20, 21, 22, 23, 24, 25 and 26 indicate the cases of reading an upper word, reading a lower word, writing an upper word, writing a lower word, writing an upper word and an upper byte, writing a lower word and an upper byte, writing an upper word and a lower byte, and writing a lower word and a lower byte, respectively.

The bus arbiter and DRAM controller 500 selects whether the DRAM 600 or the DRAM 700 is to be accessed in accordance with the signal CPU_A [23:1], the read signal RD, the upper-byte write signal UWR, the lower-byte write signal LWR out-put from the CPU 300, and controls the signals DRAM_A [8:0], RAS_U, UCAS_U, LCAS_U, WE_U, OE_U, RAS_L, UCAS_L, LCAS_L, WE_L and OE_L.

In the case of a writing operation, the bus arbiter and DRAM controller 500 selects bytes of the buses DRAM_D_U [15:0] and DRAM_D_L_[15:0] where an upper or lower byte of the bus CPU_D [15:0] is to be output. In the case of a reading operation, the bus arbiter and DRAM controller 500 selects one of the signals DRAM_D_U [15:0] and DRAM_D_L_[15:0] which is to be output to the bus CPU_D [15:0].

When an access from the CPU 300 to the DRAM's 600 and 700 and an access from the DMA controller 800 to the DRAM's 600 and 700 are concurrent, if the access from the CPU 300 and the access from the DMA controller 800 have simultaneously occurred, an access having a higher priority order is first processed. When the access from the CPU 300 has occurred during the access from the DMA controller 800, the operation of the CPU 300 is temporarily interrupted by asserting a signal Wait for the CPU 300, and the signal Wait is negated upon completion of the access from the DMA controller 800.

However, in the above-described first conventional example, if a plurality of apparatuses for generating addresses are present, it is necessary to provide a plurality of functions of prohibiting a request an address outside a set address region within the system, resulting in an increase in the circuit scale.

In the above-described second conventional example, since a refreshing operation is performed during an access to the ROM, if the ROM is not accessed for a long time period, and, for example, if the CPU continues to access the DRAM using a block transfer command, the opportunity to refresh the DRAM decreases. Hence, it is necessary to refresh the DRAM by forcedly interrupting the processing by the CPU temporarily, resulting in a decrease in the efficiency of use of the CPU.

SUMMARY OF THE INVENTION

The present invention has been made in consideration of the above-described problems.

It is an object of the present invention to provide a bus arbiter which can avoid needless increase in the circuit scale within a system by providing the bus arbiter with a function, such that an apparatus for generating an address behaves as if a normal memory access were performed for a request to set an address outside a set address region where a corresponding device is absent, with a simple configuration, so that a function of prohibiting a request to set an address outside the set address region which has been necessary for the apparatus for generating an address can be omitted.

It is another object of the present invention to provide a bus arbiter which can process data in a register that does not need an address in the same sequence as when an apparatus for generating an address accesses data of a DRAM, by providing a selector for setting an address outside a set address region in the apparatus for generating an address.

It is still another object of the present invention to provide a bus arbiter which can prevent runaway of a system by transmitting a CPU RESET command to a request to set an address outside a set address region where a corresponding device is absent.

It is yet another object of the present invention to provide a bus arbiter in which, by adding a function of refreshing a DRAM connected to a DRAM data bus which is not accessed by a CPU when the CPU accesses a DRAM to a bus arbiter and DRAM controller, an operation of refreshing the DRAM by temporarily interrupting processing by the CPU even when the DRAM is continuously accessed by a block transfer command becomes unnecessary, thereby improving the efficiency of use of the CPU.

According to one aspect, the present invention which achieves these objectives relates to a bus arbiter for controlling a bus shared by a CPU and a plurality of apparatuses for generating addresses, including determination means for determining if a request of an address is a request of an address where a corresponding device is absent, and processing means for passing the request by transmitting an ACK signal without performing a writing operation for a request of a writing operation, and transmitting dummy data and an ACK signal without performing a reading operation for a request of a reading operation, when the determination means has determined that the request is a request of an address where a corresponding device is absent.

According to another aspect, the present invention which achieves these objectives relates to a bus arbiter for controlling a bus shared by a CPU and a plurality of apparatuses for generating addresses, including determination means for determining if a request of an address is a request of an address where a corresponding device is absent, and processing means for passing the request by transmitting an ACK signal without performing a writing operation for a request of a writing operation, and transmitting dummy data and an ACK signal without performing a reading operation for a request of a reading operation when the determination means has determined that the request is a request of an address where a corresponding device is absent. Selection means for selecting one of setting of an address within a set address region and setting of an address outside the set address region where a corresponding device is absent is provided in each of the apparatuses for generating addresses.

According to still another aspect, the present invention which achieves these objectives relates to a bus arbiter for controlling a bus shared by a CPU and a plurality of apparatuses for generating addresses, including determination means for determining if a request of an address is a request of an address where a corresponding device is absent, processing means for passing the request by transmitting an ACK signal without performing a writing operation for a request of a writing operation, and transmitting dummy data and an ACK signal without performing a reading operation for a request of a reading operation when the determination means has determined that the request is a request of an address where a corresponding device is absent, and means for transmitting a CPU command for specific data for a request for a reading operation from an address outside a set address region where a corresponding device is absent.

According to yet another aspect, the present invention which achieves these objectives relates to a bus arbiter, used in a system in which a CPU data bus and a DMA data bus having a bus width equal to n times a bus width of the CPU data bus are connected to a DRAM data bus having a bus width equal to the bus width of the DMA data bus via the bus arbiter also operating as a DRAM controller, including arbitration means for refreshing a DRAM connected to the DRAM data bus which is not accessed by the CPU when the CPU accesses another DRAM.

The foregoing and other objects, advantages and features of the present invention will become more apparent from the following description of the preferred embodiments taken in conjunction with the accompanying drawings.

BRIEF DESCRIPTION OF THE DRAWINGS

FIG. 26 is a timing chart for writing a lower byte of a lower word corresponding to the upper word shown in FIG. 25.

DESCRIPTION OF THE PREFERRED EMBODIMENTS

First Embodiment

A description will now be provided of a first embodiment of the present invention with reference to the drawings.

Figure 1:
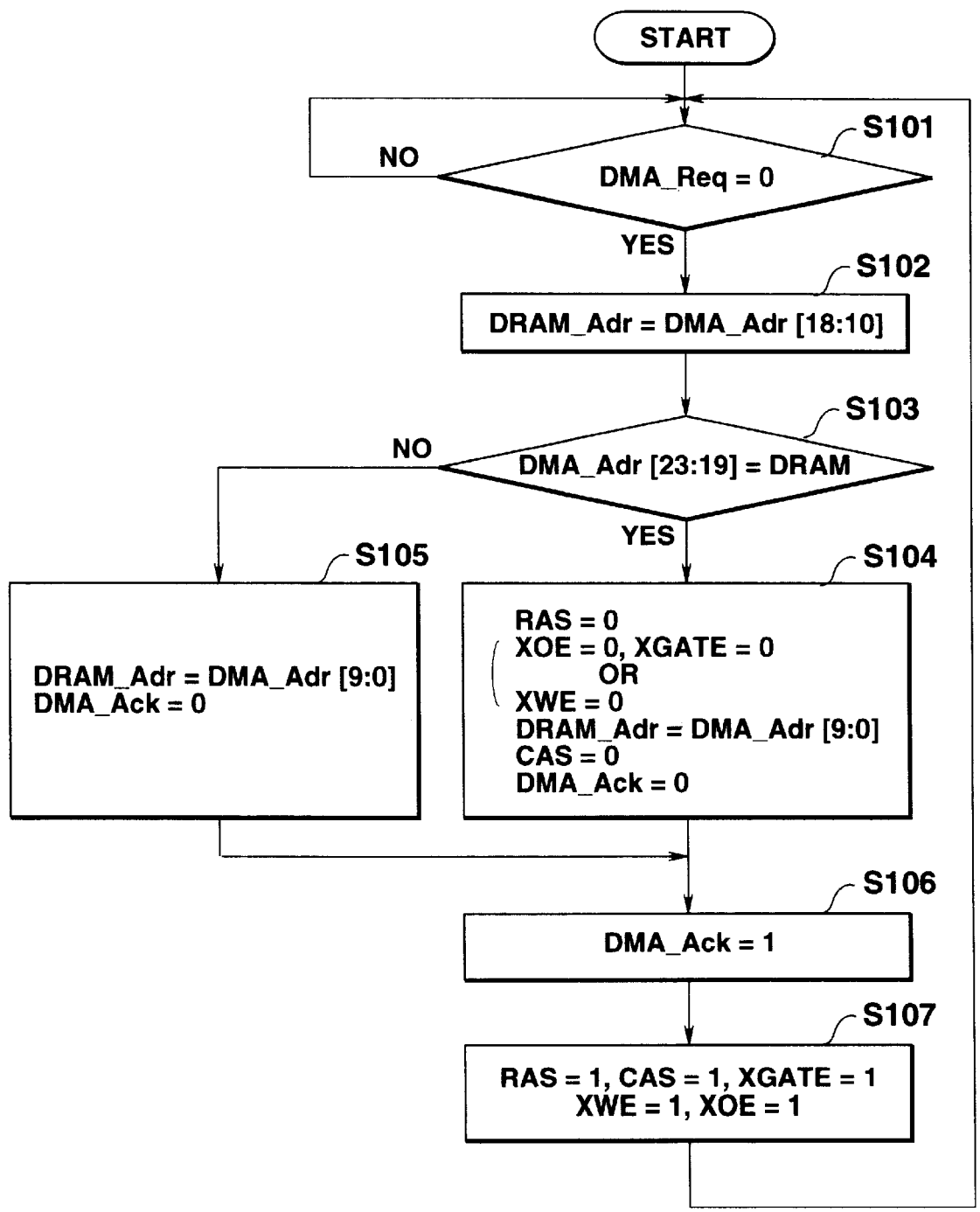
FIG. 1 is a flowchart illustrating the operation of a bus arbiter according to a first embodiment of the present invention.
Figure 2:
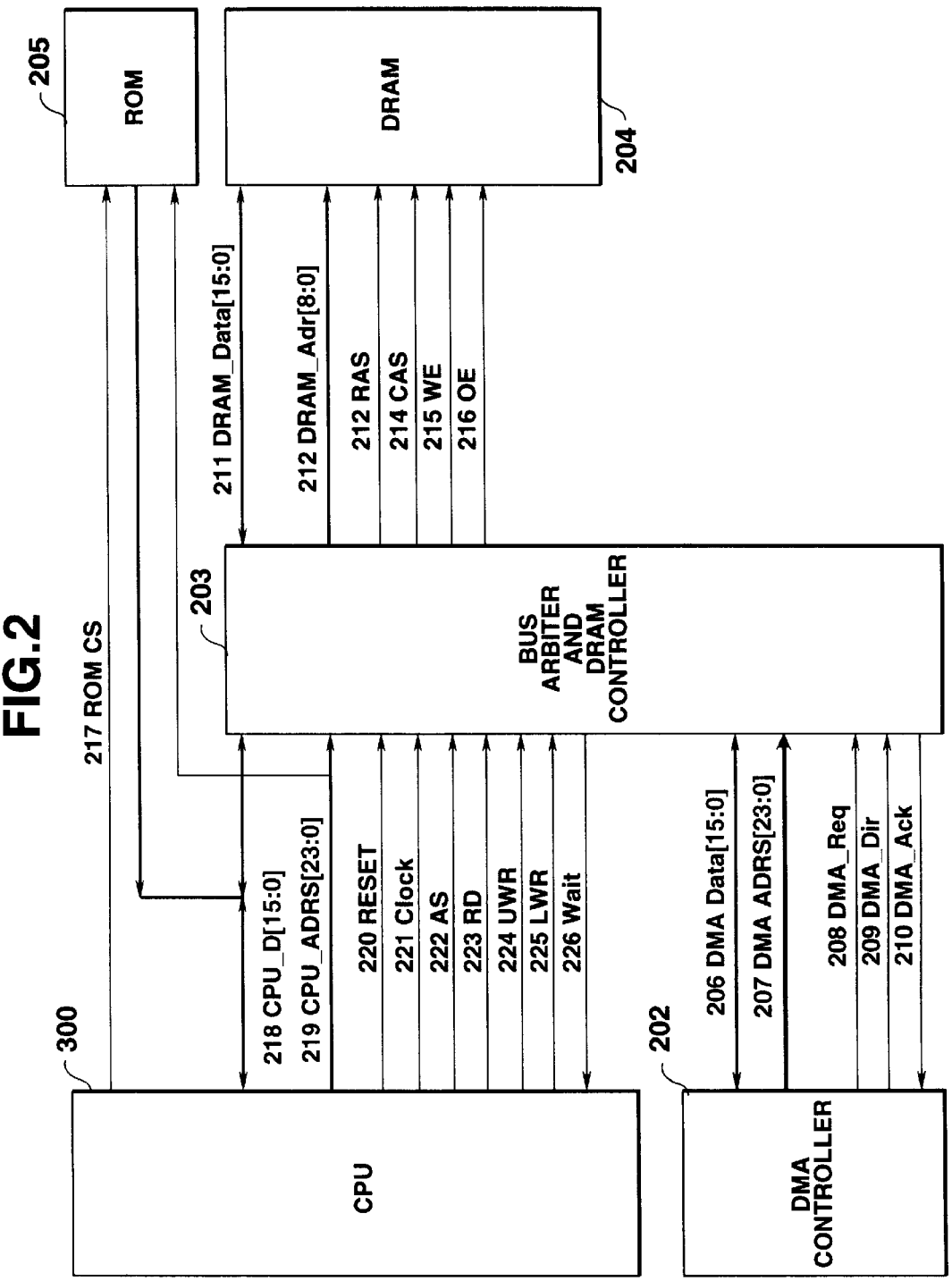
FIG. 2 is a block diagram illustrating the configuration of the bus arbiter shown in FIG. 1.
Figure 3:
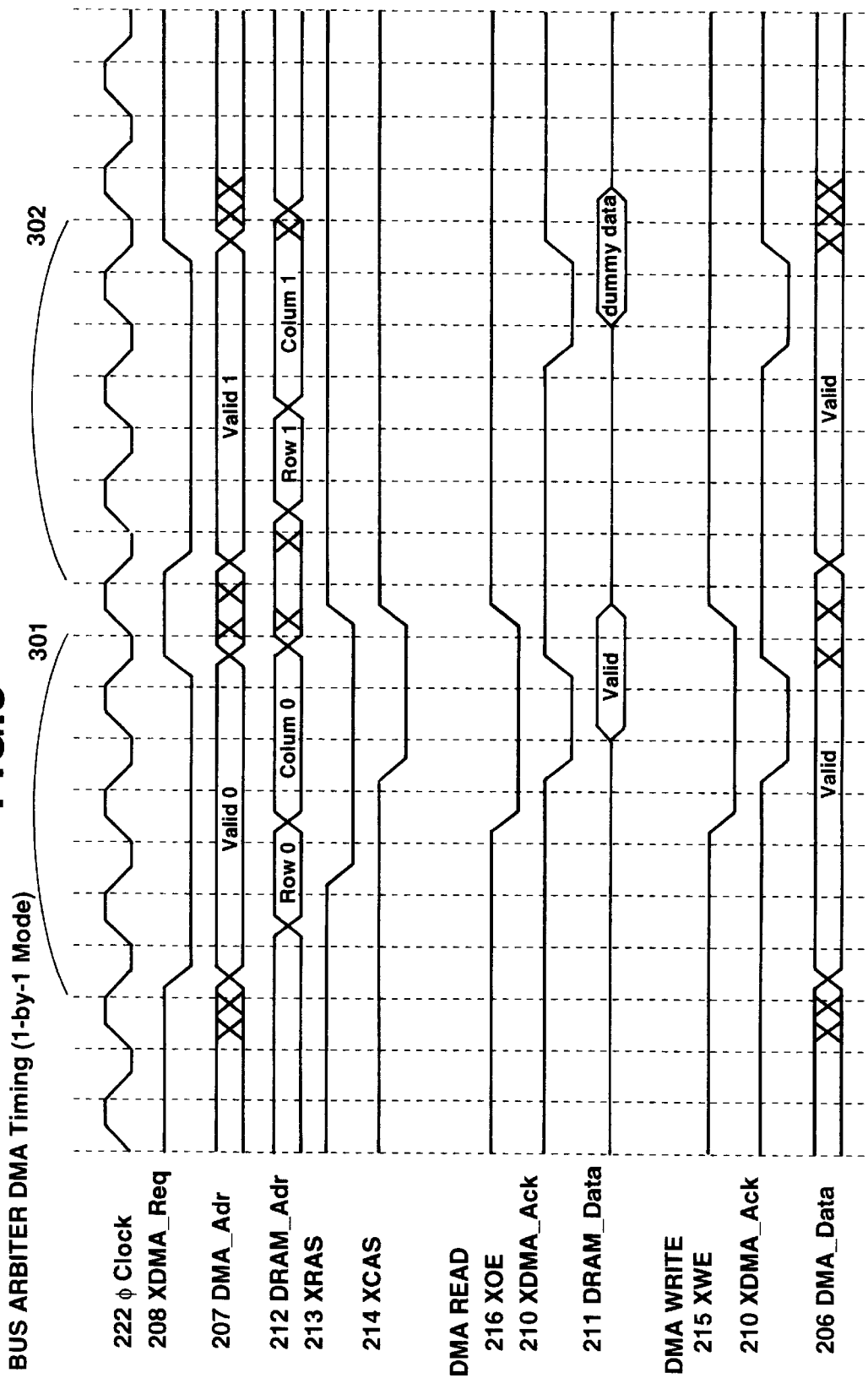
FIG. 3 is a timing chart of the system shown in FIG. 2.

FIG. 1 is a flowchart illustrating the operation of a bus arbiter according to the first embodiment. FIG. 2 is a block diagram illustrating the configuration of the bus arbiter shown in FIG. 1. FIG. 3 is a timing chart of the system shown in FIG. 2.

In FIG. 2, a CPU 201 has a data bus width of 16 bits. A DMA controller 202 has the same data bus width as the CPU 201. A bus arbiter 203 also operates as a DRAM controller for arbitrating accesses from the CPU 201 and the DMA controller 202 to a DRAM 204. A ROM 205 stores programs to be executed by the CPU 201.

In FIG. 3, reference numeral 301 represents the operation of DMA WRITE and DMA READ in the case of an ordinary request of an address within a set region, and reference numeral 302 represents the operation of DMA WRITE and DMA READ in a Dummy DMA Mode in the case of a request of an address outside the set region.

In both of the operations 301 and 302, during DMA READ, as shown at the left side of FIG. 3, the operation is indicated by signal lines of a system clock signal Clock 221, a DMA request signal DMA_Req 208, a DMA address bus DMA_Adr 207, a DRAM address bus DRAM_Adr 212, a DRAM row-address strobe signal RAS 213, a DRAM column-address strobe signal CAS 214, a DRAM read signal OE 216, a DMA acknowledge signal DMA_Ack 210, and a DRAM data bus DRAM_Data 211. These signal lines correspond to the signal lines shown in FIG. 2.

During DMA WRITE, the operation is indicated by signal lines of the signals 221, 208, 207, 212, 213 and 214, and a DRAM write signal WE 215, and DMA_Data 210 and 206.

In the first embodiment, a description will be provided by making the DRAM 204 a set address region, and illustrating DMA (One-by-One DMA Mode) in an ordinary read cycle or write cycle. In this case, the bus arbiter 203 is assumed to perform two operations, i.e., ordinary DMA (One-by-One DMA Mode), and DMA (Dummy DMA Mode) when setting an address outside the set address region. (Arbitration procedures for determining an address region and a priority order of the bus arbiter, and the like are not limited to any specific ones.)

Next, the operation will be described with reference to the flowchart shown in FIG. 1, and FIGS. 2 and 3. In FIG. 1, ordinary DMA (One-by-One DMA Mode) corresponds to the flow of steps S101—104, S106 and S107. The timing chart in this case corresponds to the operation 301 shown in FIG. 3.

First, when the DMA_Req signal 208 has been asserted (step S101), 18–10 bits of the DMA address bus 207 set by the DMA controller 202, and a signal DMA_Adr [18:10] are output to the bus DRAM_Adr [8:0] 212 of the DRAM 204 (step S102).

It is then determined if a signal DMA_Adr [23:19] is within the region of the DRAM 204 (step S103). If the result of the determination is affirmative, and in the case of a DMA write request, after asserting the signal RAS 213 by the fall of the clock signal 221, the signals OE 216 and WE 215 are asserted in the case of a reading operation and a writing operation, respectively, by the next fall of the clock signal 221. At the same time, the signal DMA_Adr [9:0] 207 is output to the bus DRAM_Adr [8:0] 212. At the next fall of the clock signal 221, the signals CAS 214 and DMA_Ack 210 are asserted (step S104).

After one pulse of the clock signal 221, the signal DMA_Ack is negated (step S106). At the next rise of the clock signal 221, the signals RAS, CAS, WE, OE and GATE are negated, and the One-by-One DMA Mode is terminated (step S107).

DMA (Dummy DMA Mode) of passing processing means when an address is outside the set address region corresponds to the flow of steps S101–S103, and S105–S107. The timing chart for this case corresponds to the operation 302 shown in FIG. 3.

After passing through steps S101 and S102, in step S103, it is determined if [23:19] bits of the signal DMA_Adr [23:0] 207 transmitted from the DMA controller 202 indicate the region of the DRAM 204, serving as the assigned address region in this case. If the result of the determination is negative, the mode shifts to the Dummy DMA Mode of the operation 302 shown in FIG. 3. The DMA_Ack signal 210 is transmitted in response to the DMA_Req signal 208 from the DMA controller 202. In the case of a reading operation, specific dummy data 211 is output, and access to the DRAM 204 (RAS 213, CAS 214, OE 217 and WE 216) is not performed (step S105). Thereafter, processing of steps S106 and S107 is performed, and the process is terminated.

As described above, according to the first embodiment, by adding means for performing step S103 for determining a request from the DMA controller 202 to the bus arbiter 203, and performing passing processing using dummy data or the like, it is possible to provide the bus arbiter with a simple function easy to operate which can replace devices, such as an address decoder and a control processor, for referring to an address map of the entire system, constituting a function of prohibiting a request of (writing in or reading from) an address outside a set address region required for the DMA controller 202. As a result, the circuit scale can be reduced compared with other approaches.

Second Embodiment

Next, a description will be provided of a second embodiment of the present invention.

In the second embodiment, the sequence of the DMA controller 202 is simplified by utilizing the function of the bus arbiter 203 having the Dummy DMA Mode used in the first embodiment. FIGS. 1, 2 and 3, which apply to the first embodiment, also apply to the second embodiment.

When the DMA controller 202 has a mode A of processing data input to an input buffer storage, writing the data in a register and the DRAM, then reading out the data, selecting the data by a selector, and inputting the selected data to an output buffer storage, and a mode B of writing and reading data only in and from the register, by using the bus arbiter 203 having the Dummy DMA Mode, serving as processing means for performing passing processing, DMA write and read addresses are set outside and inside the assigned set region in the mode A and in the mode B, respectively. Thus, both of the modes A and B can be controlled using the same circuit and the same channel.

As described above, according to the second embodiment, since both of the modes A and B can use the same circuit, it is possible to simplify the sequence of the DMA controller and to reduce the circuit scale, and, for example, to apply this approach to a dual-port memory.

Third Embodiment

Next, a description will be provided of a third embodiment of the present invention.

While the first and second embodiments relate to passing processing when the DMA controller 202 accesses the DRAM 204, the bus arbiter 203 of the third embodiment can also perform passing processing for a request of an address outside the set address region from the CPU 201 as a Dummy Mode using an Ack signal from the CPU 201. Hence, as in the case of an access from the DMA controller 202 to the DRAM 204, accesses from the CPU 201 to the DRAM 204 and the ROM 205 can be similarly processed in the Dummy Mode by making the memories (DRAM 204 and ROM 205) assigned address regions.

In this case, the CPU 201 uses signal lines of the chip select signal ROMCS 217, the CPU data bus CPU_D 218 having a bus width of 16 bits, the CPU address bus CPU_A 219, the reset signal Reset 220, the system clock signal Clock 221, the address strobe signal AS 222, the read signal RD 223, the write signal WR 224, the signal Wait 225, and a signal CPU_Ack (not shown).

As described above, according to the second embodiment, the same effects as in the first and second embodiments can be obtained even in the case of an access from the CPU 201. Such Dummy Mode processing has an advantage that, when predetermined lined-up devices are increased/reduced in a system, procesures, such as updating and confirmation of an address map at every increase/reduction, can be omitted. Another advantage is that, in a system in which access allowance classes are set from the viewpoint of security, an access allowance range can be easily changed only by selector processing.

Fourth Embodiment

While each of the first through third embodiments relates to an operation relating to a memory access, a fourth embodiment of the present invention relates to protection of a system. The bus arbiter 203 of the fourth embodiment is configured such that a CPU Reset command (CPU command) can be output as specific dummy data for a request of a reading operation from an address outside a set address region where a corresponding device is absent.

If it is determined that there is a possibility of occurrence of abnormality when an address outside a memory is set from the CPU 201 or the DMA controller 202, or from a situation such that, for example, the same access is performed in a loop even after the passing processing in the Dummy Mode, the system determines that an abnormality has occurred, and resets the setting to prevent a rundown of the system by transmitting the CPU Reset command.

Fifth Embodiment

Next, a description will be provided of a fifth embodiment of the present invention.

Figure 4:
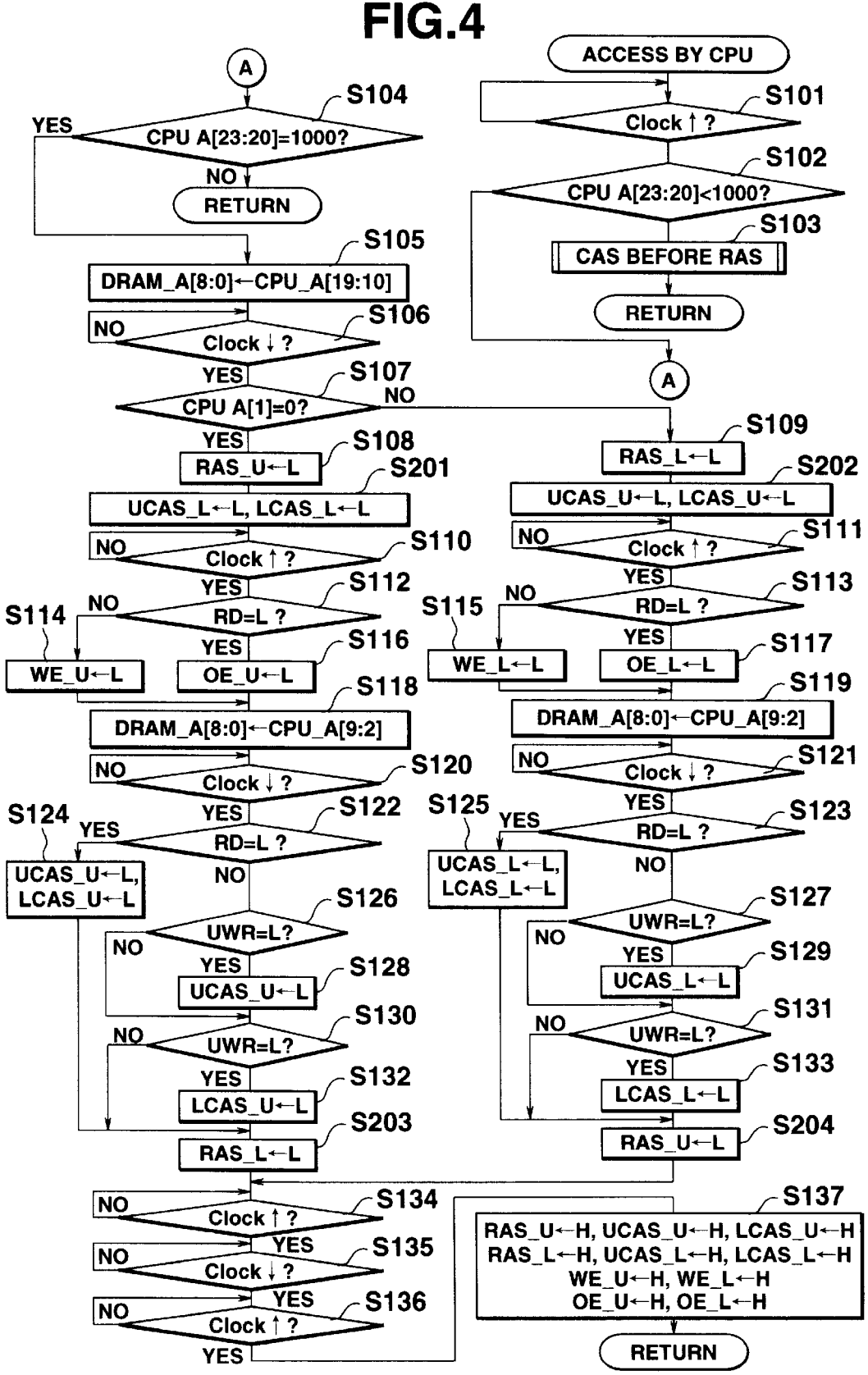
FIG. 4 is a flowchart illustrating the operation of a bus arbiter according to a fifth embodiment of the present invention.
Figure 5:
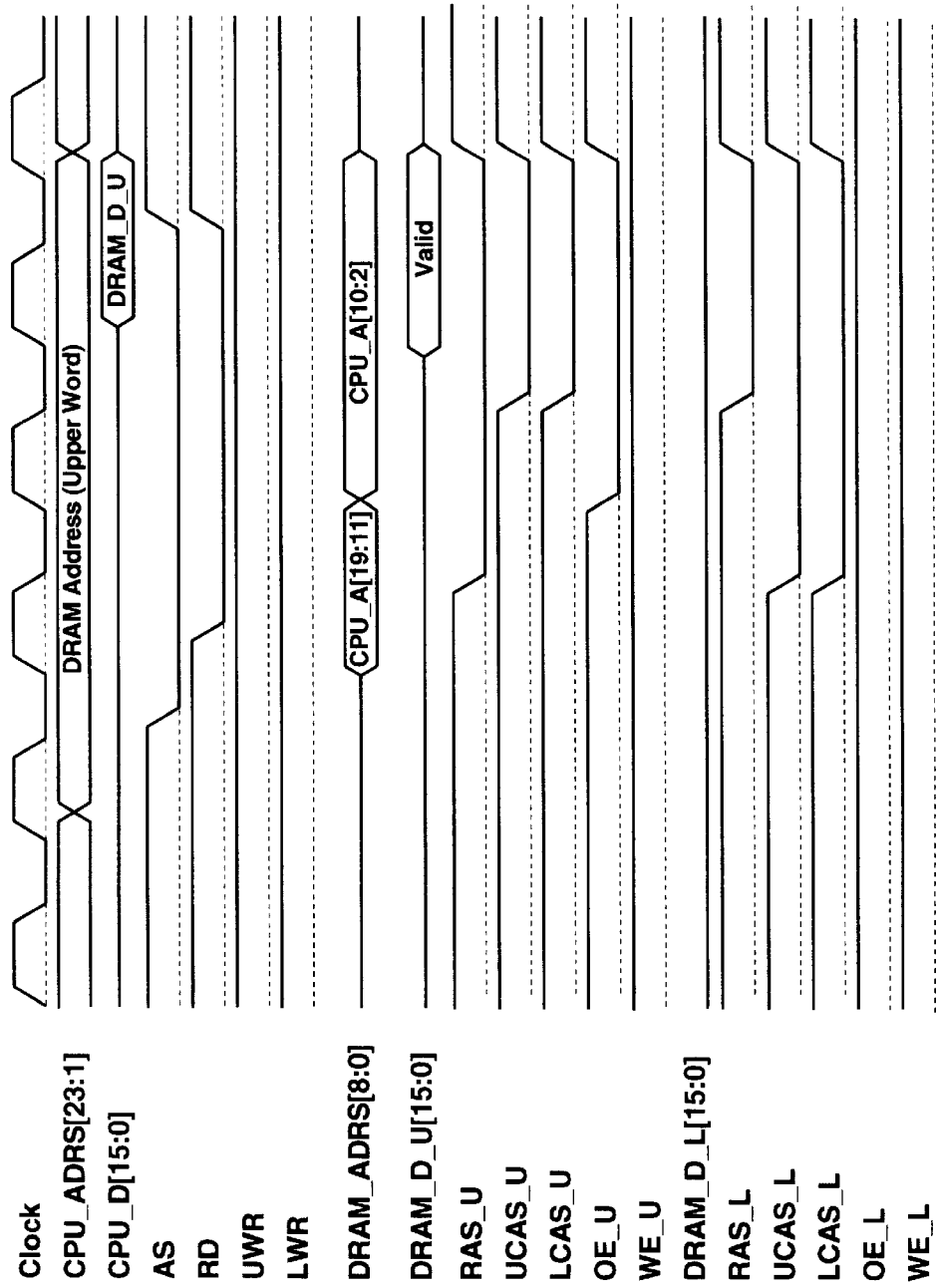
FIG. 5 is a timing chart for reading an upper word in the bus arbiter shown in FIG. 4.
Figure 6:
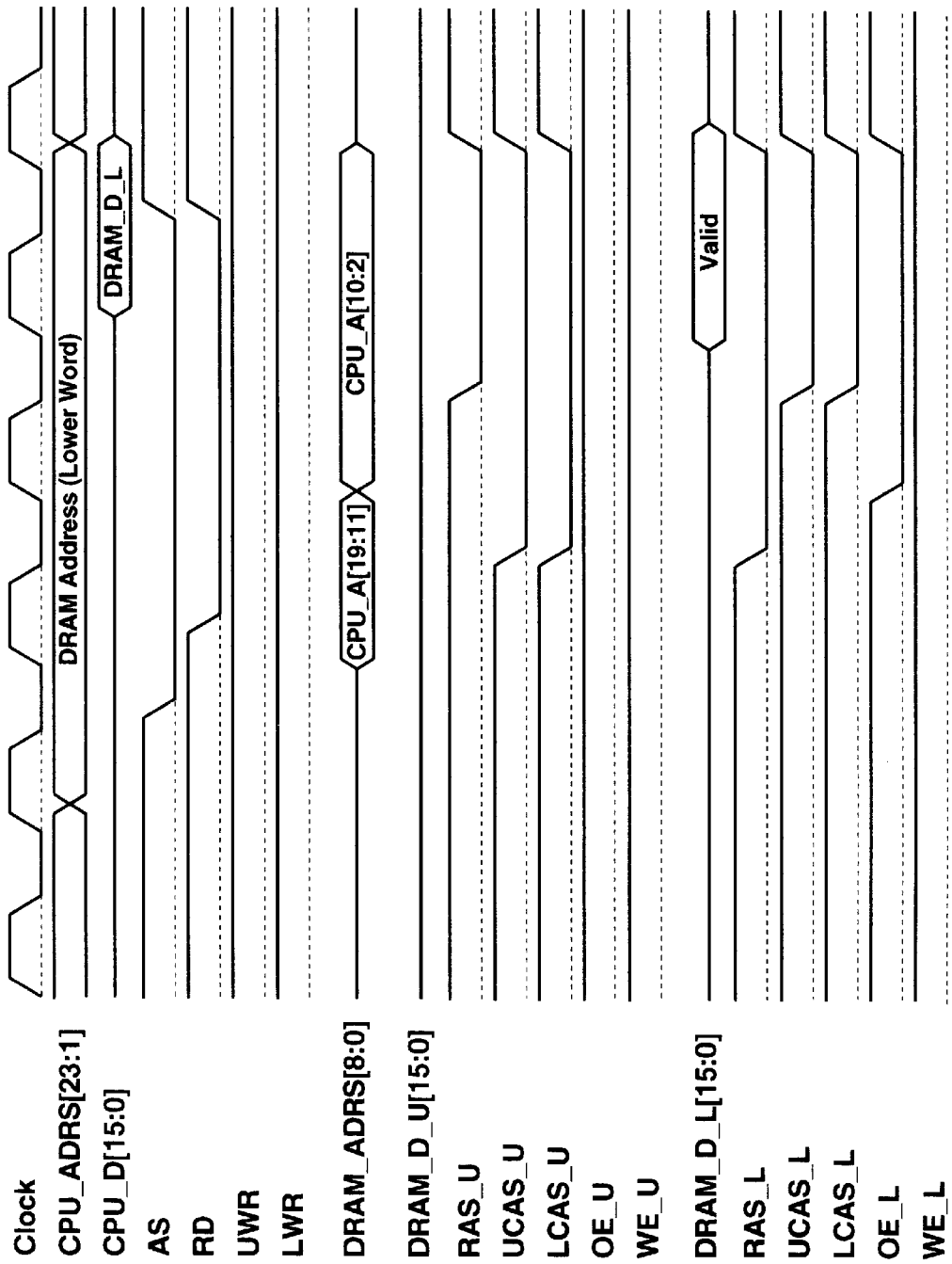
FIG. 6 is a timing chart for reading a lower word corresponding to the upper word shown in FIG. 5.
Figure 7:
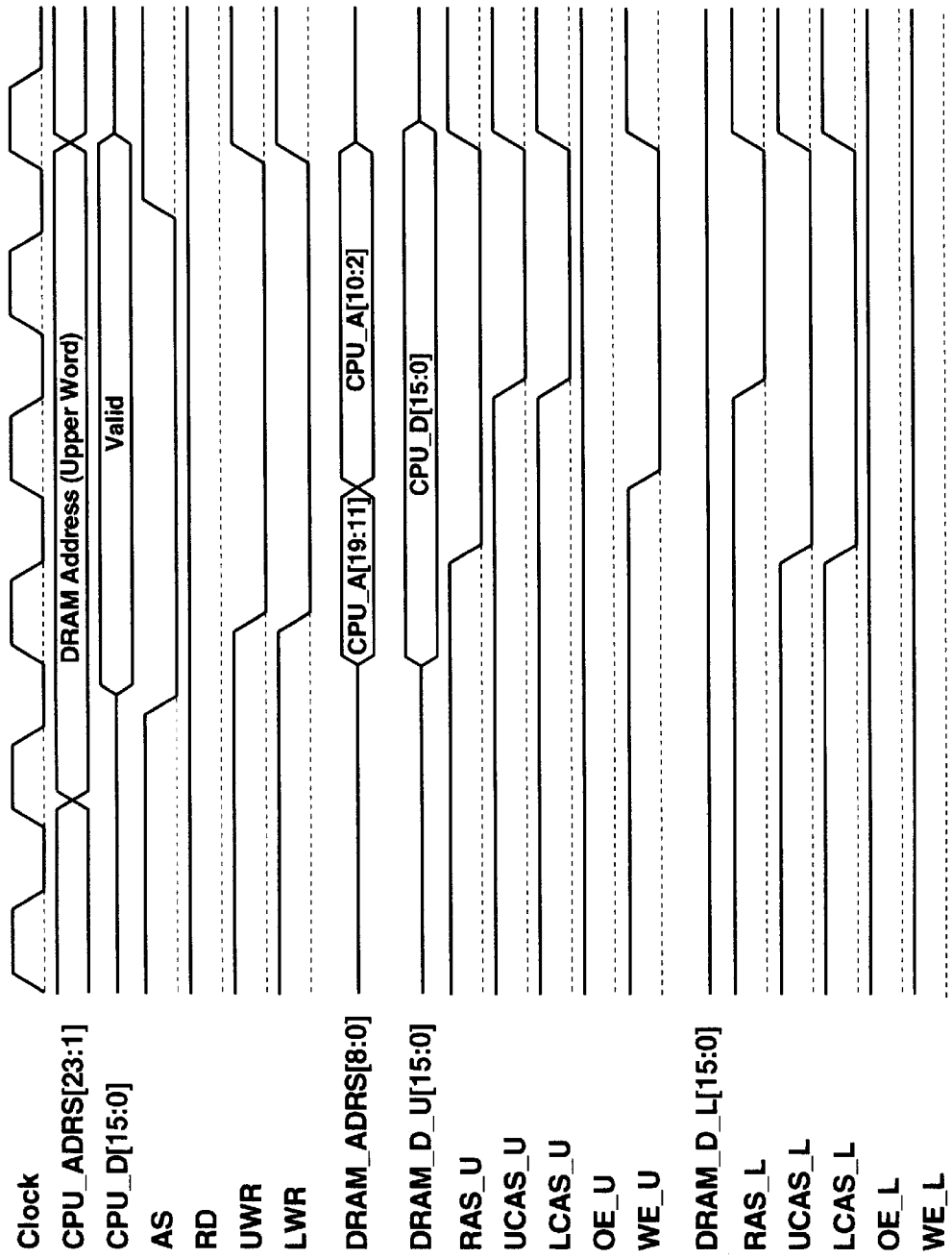
FIG. 7 is a timing chart for writing an upper word in the bus arbiter shown in FIG. 4.
Figure 8:
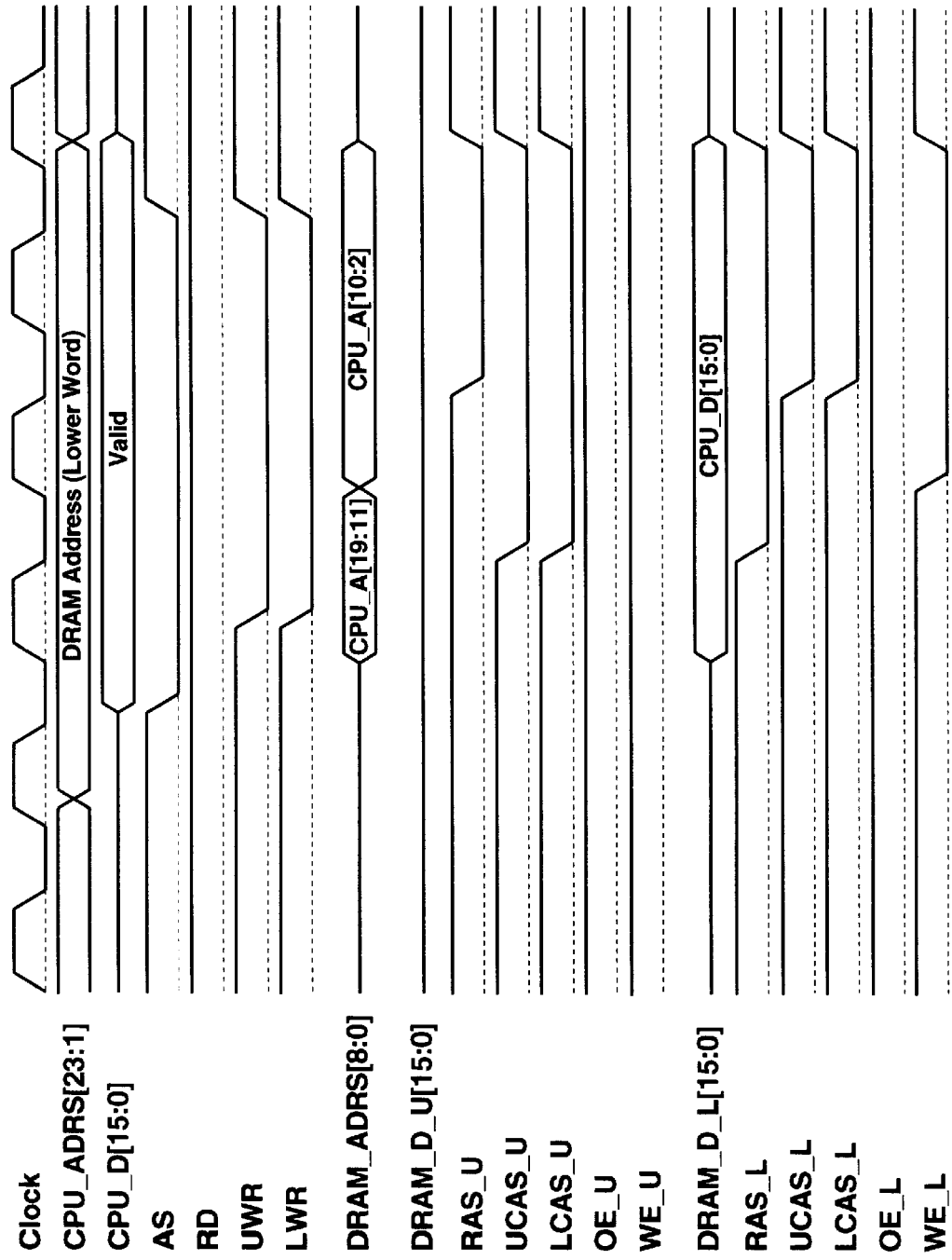
FIG. 8 is a timing chart for writing a lower word corresponding to the upper word shown in FIG. 7.
Figure 9:
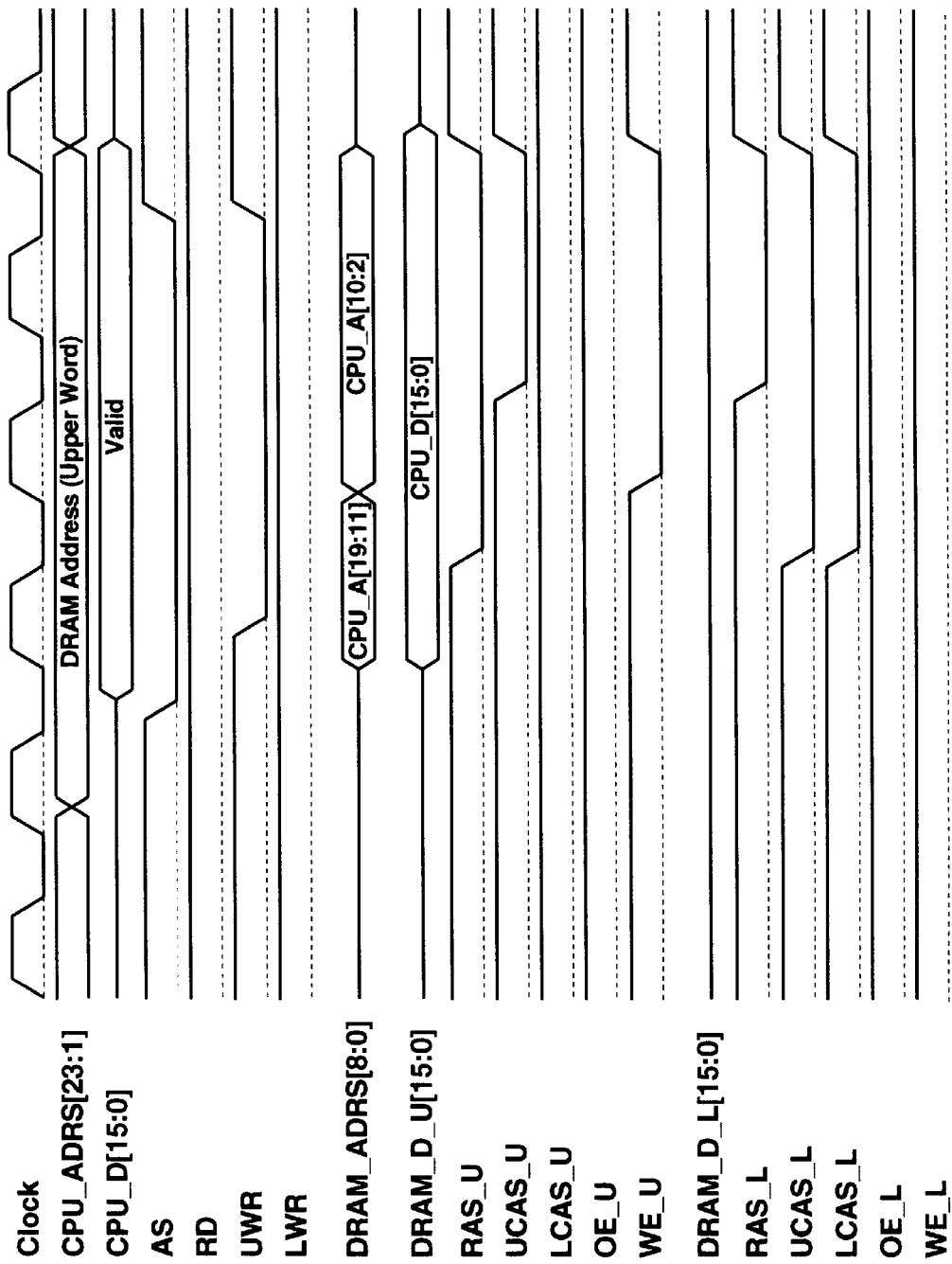
FIG. 9 is a timing chart for writing an upper byte of n upper word in the bus arbiter shown in FIG. 4.
Figure 10:
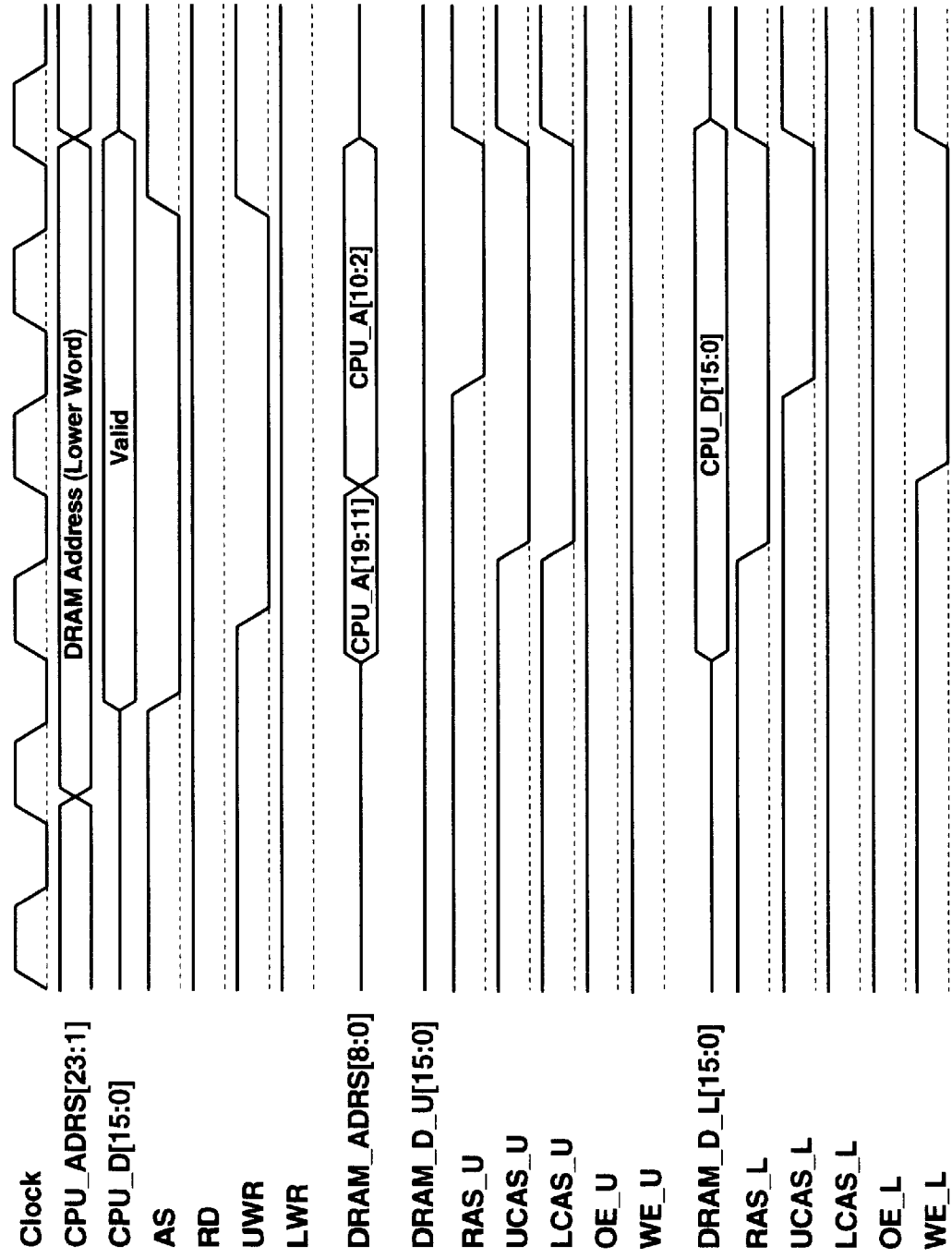
FIG. 10 is a timing chart for writing an upper byte of a lower word corresponding to the upper word shown in FIG. 9.
Figure 11:
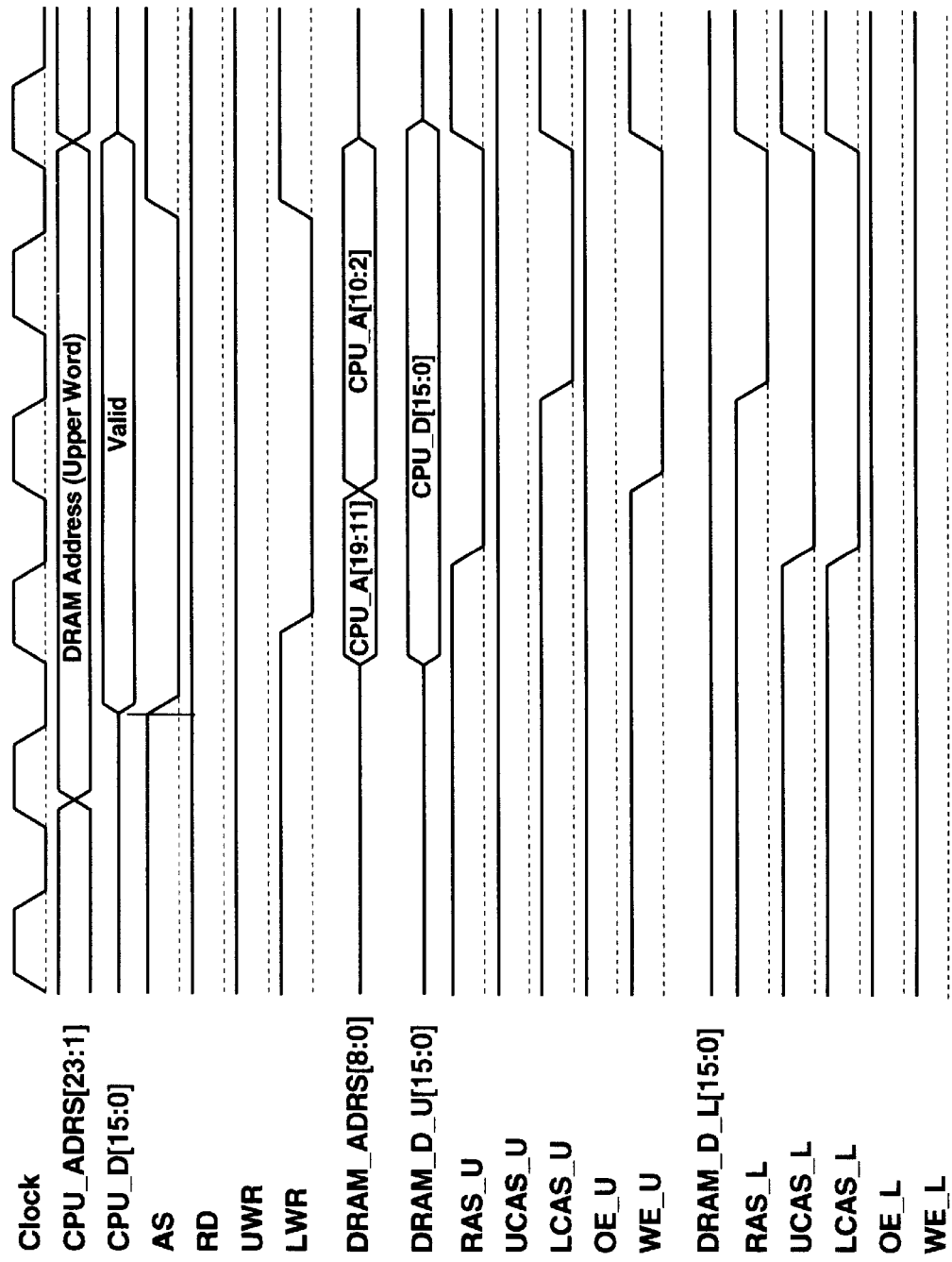
FIG. 11 is a timing chart for writing a lower byte of an upper word in the bus arbiter shown in FIG. 4.
Figure 12:
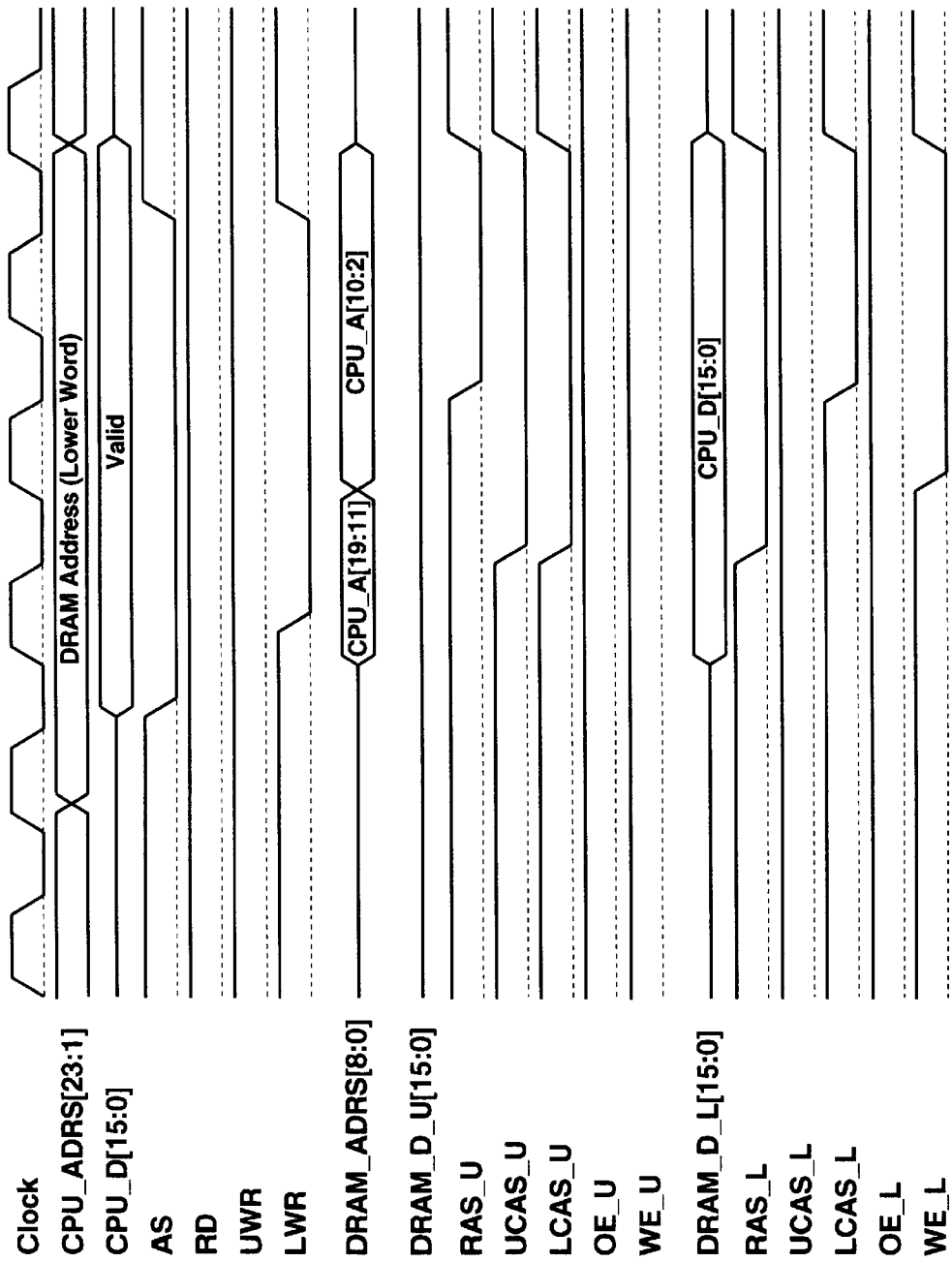
FIG. 12 is a timing chart for writing a lower byte of a lower word corresponding to the upper word shown in FIG. 11.

FIG. 4 is a flowchart illustrating the operation of a bus arbiter according to the fifth embodiment. FIG. 5 is a timing chart for reading an upper word in the bus arbiter shown in FIG. 4. FIG. 6 is a timing chart for reading a lower word corresponding to the upper word shown in FIG. 5. FIG. 7 is a timing chart for writing an upper word in the bus arbiter shown in FIG. 4. FIG. 8 is a timing chart for writing a lower word corresponding to the upper word shown in FIG. 7. FIG. 9 is a timing chart for writing an upper byte of an upper word in the bus arbiter shown in FIG. 4. FIG. 10 is a timing chart for writing an upper byte of a lower word corresponding to the upper word shown in FIG. 9. FIG. 11 is a timing chart for writing a lower byte of an upper word in the bus arbiter shown in FIG. 4. FIG. 12 is a timing chart for writing a lower byte of a lower word corresponding to the upper word shown in FIG. 11.

Figure 13:
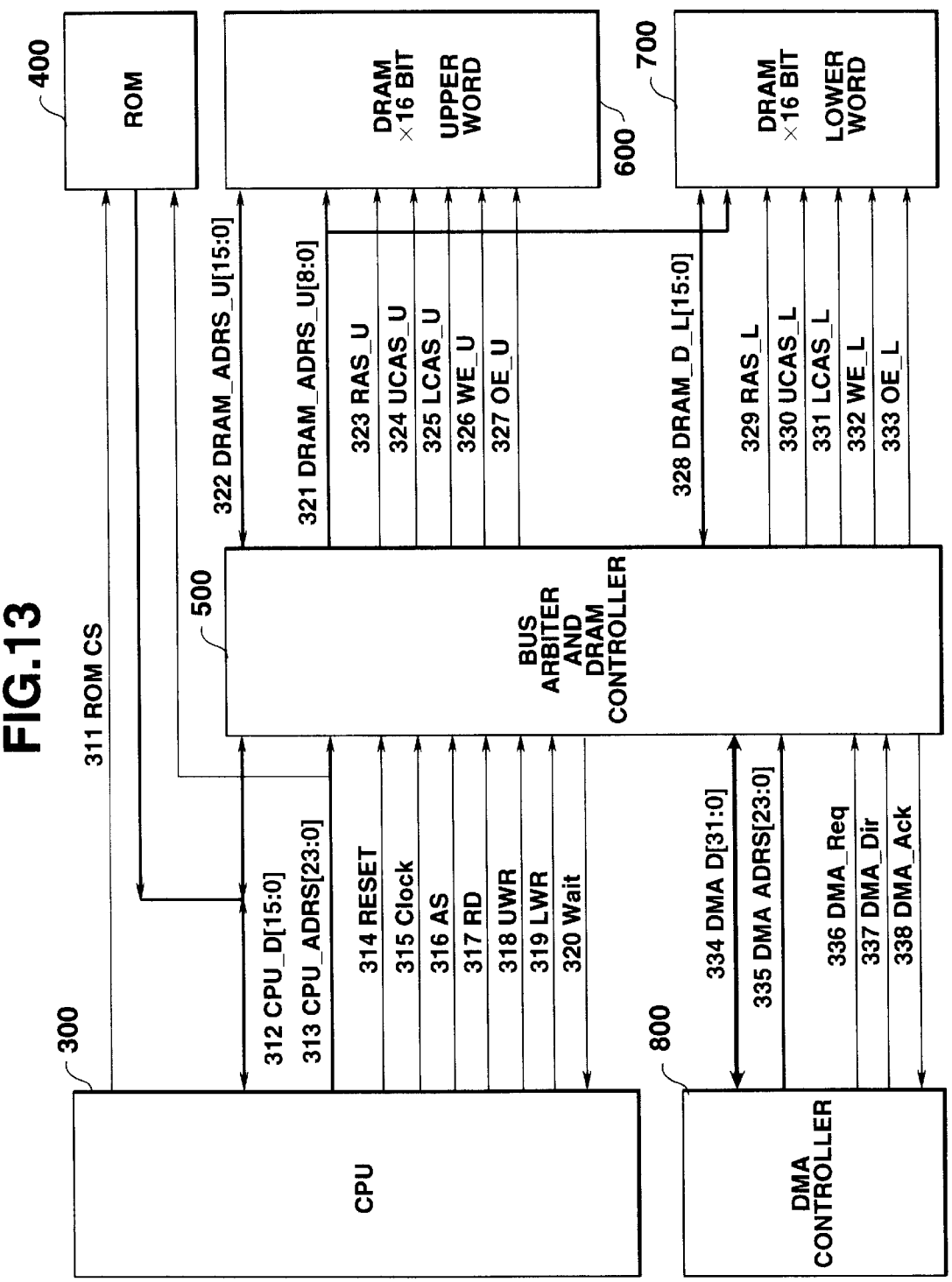
FIG. 13 is a block diagram illustrating a conventional bus arbiter also operating as a DRAM controller.

The block diagram of the conventional approach shown in FIG. 13 is also used in the fifth embodiment. Hence, further description thereof will be omitted.

The operation will now be described with reference to the flowchart shown in FIG. 4.

Figure 14:
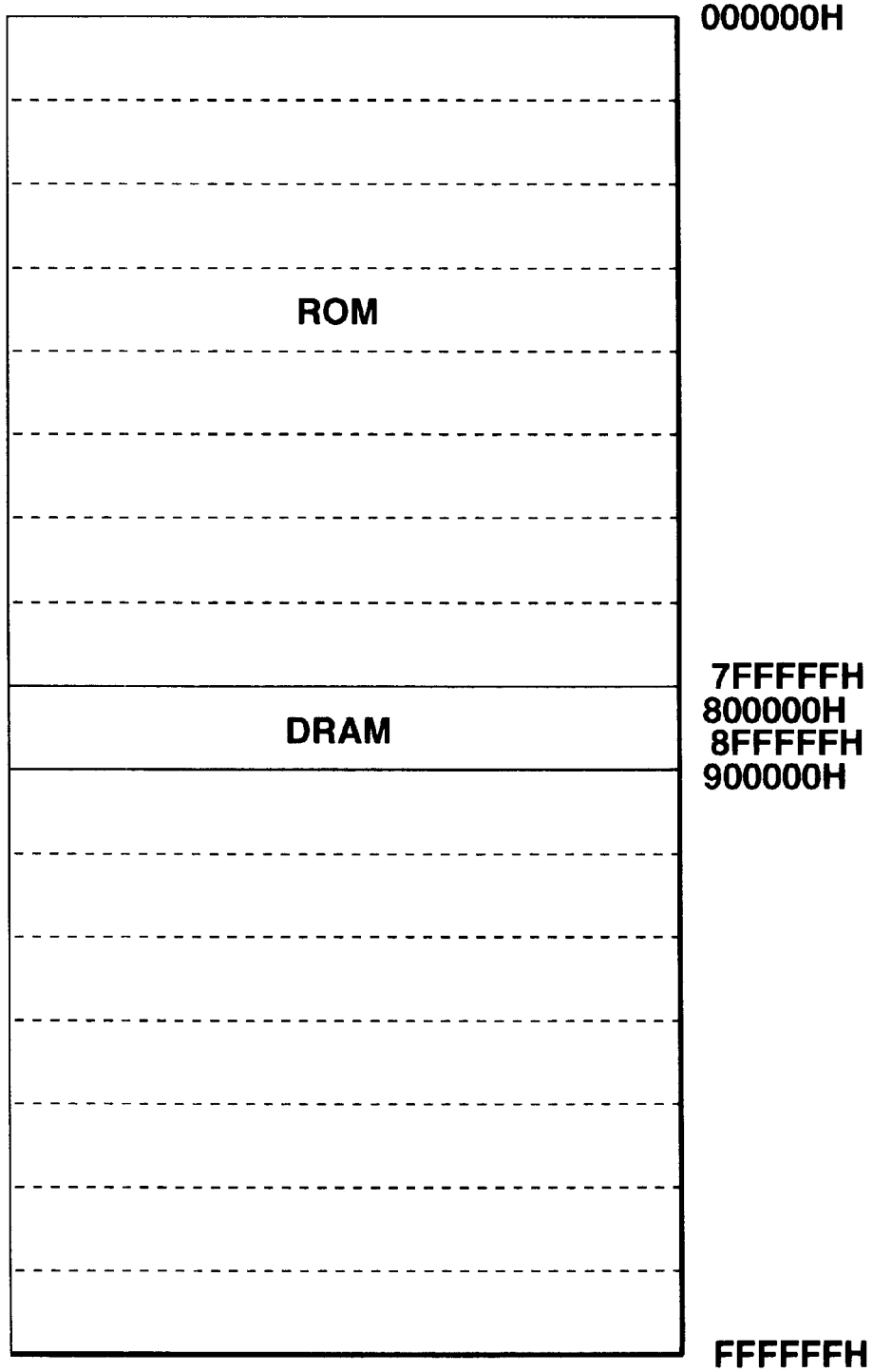
FIG. 14 is an address map for the system shown in FIG. 13.
Figure 15:
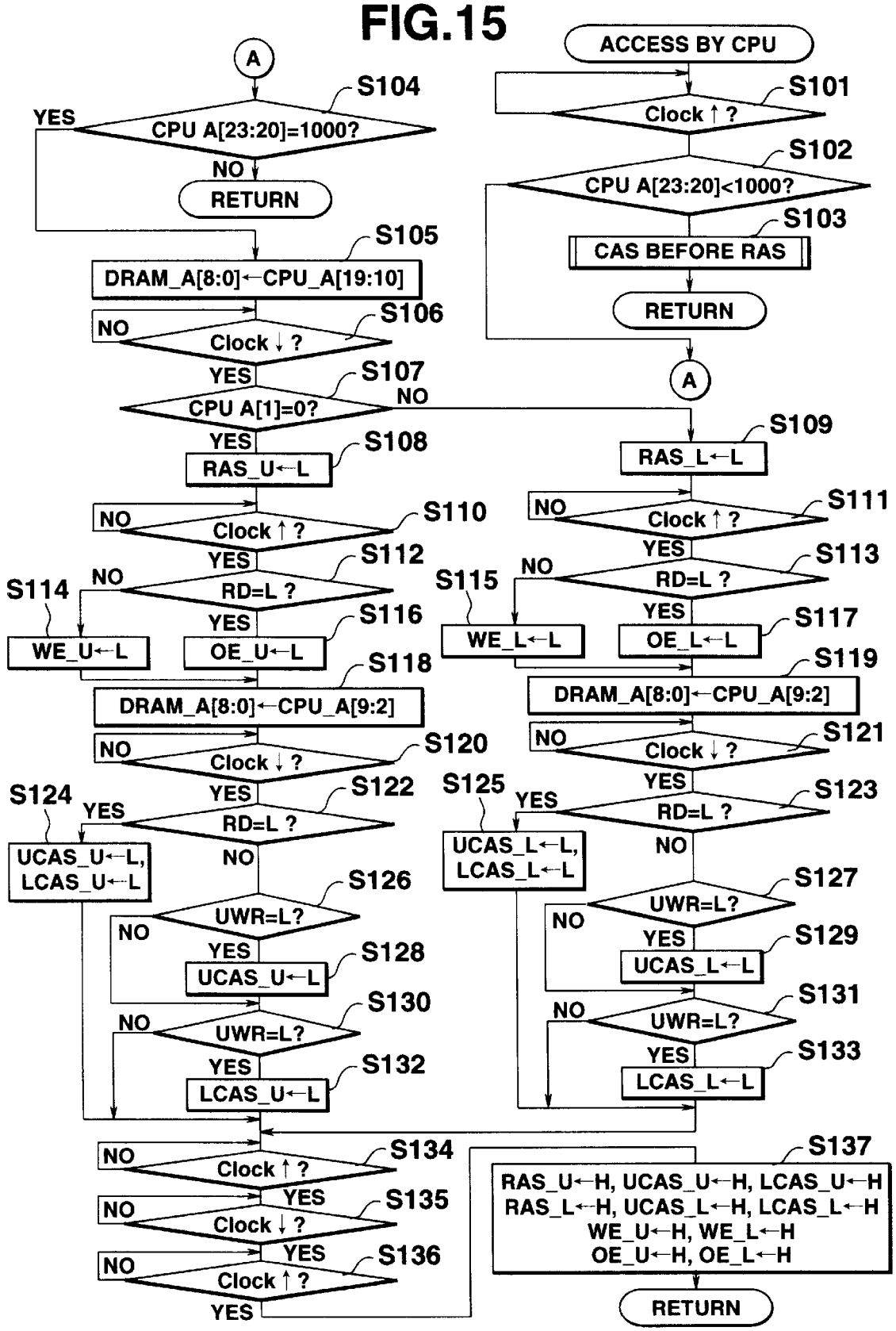
FIG. 15 is a flowchart illustrating the operation of the bus arbiter shown in FIG. 13.
Figure 16:
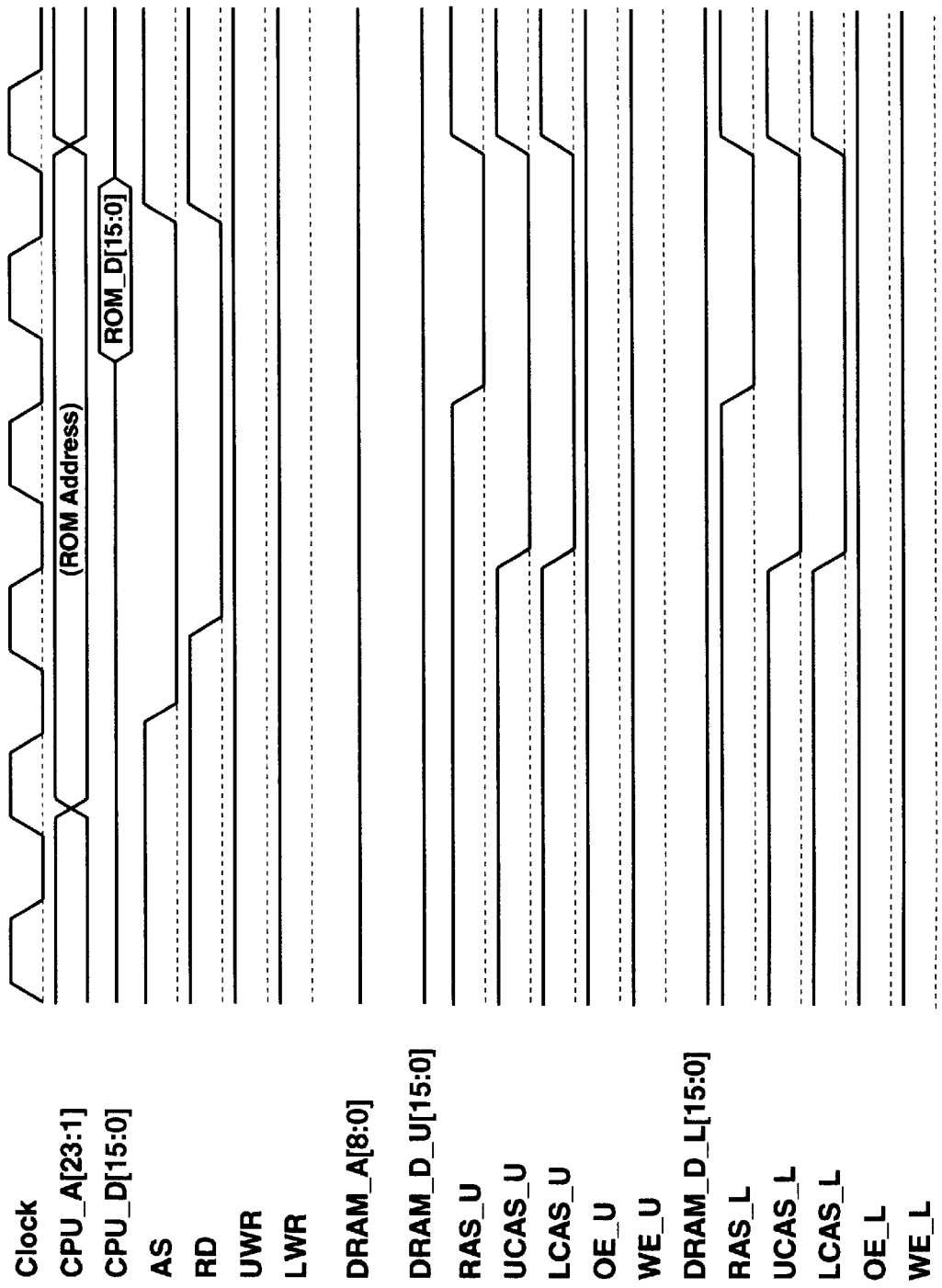
FIG. 16 is a timing chart for refreshing a DRAM in the bus arbiter shown in FIG. 13.
Figure 17:
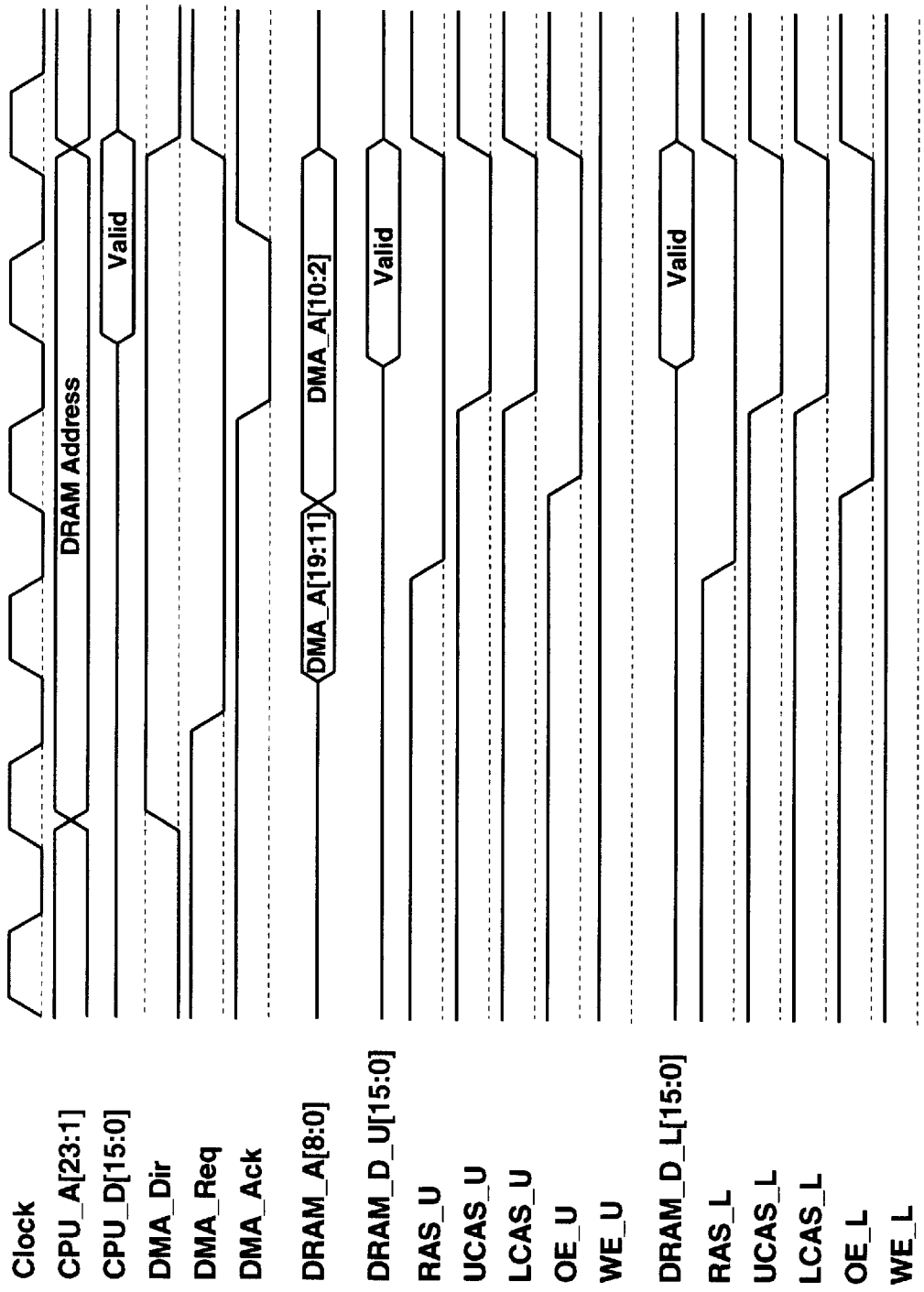
FIG. 17 is a timing chart for reading the DRAM by the DMA controller shown in FIG. 13.
Figure 18:
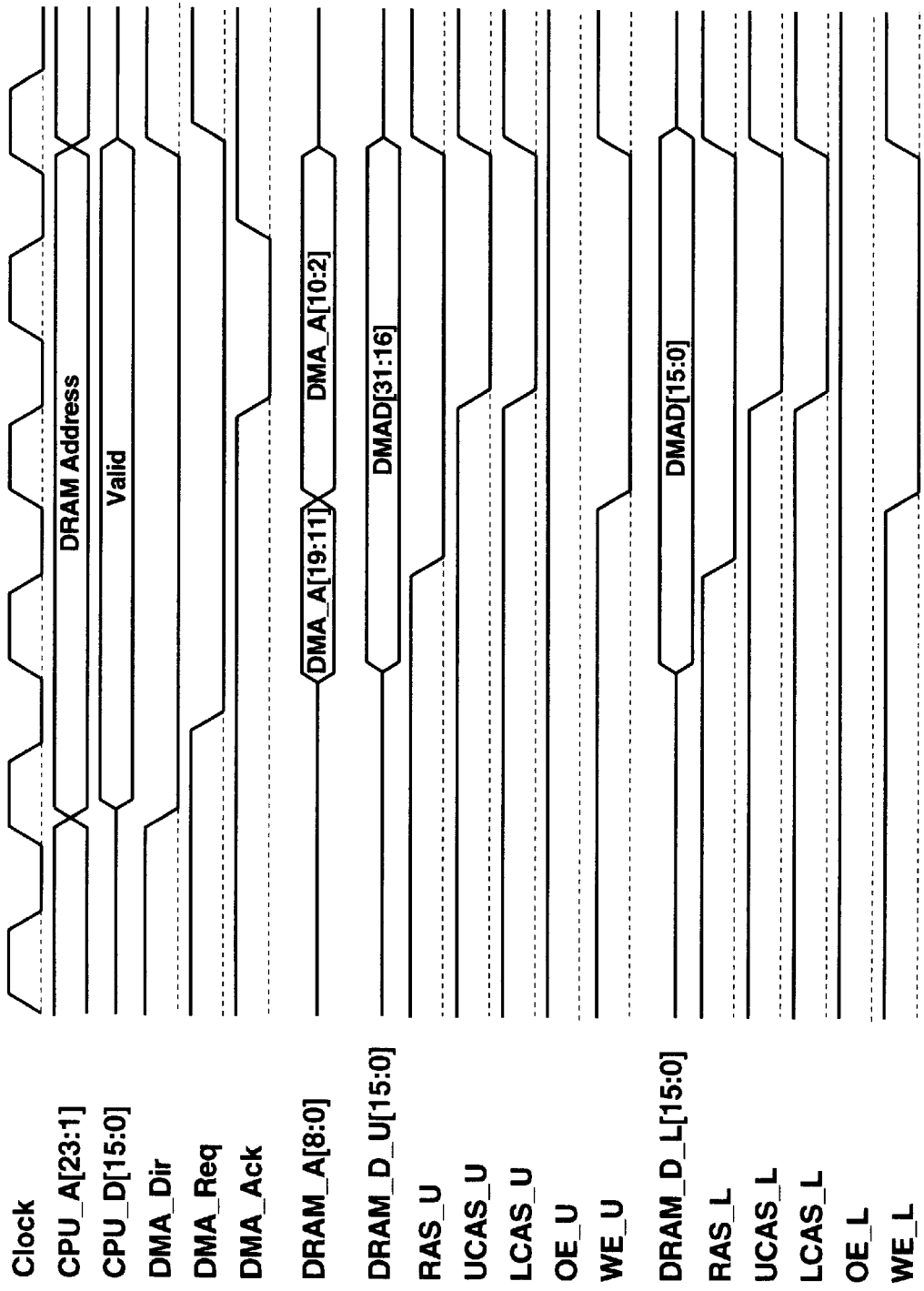
FIG. 18 is a timing chart for writing in the DRAM shown in FIG. 17.
Figure 19:
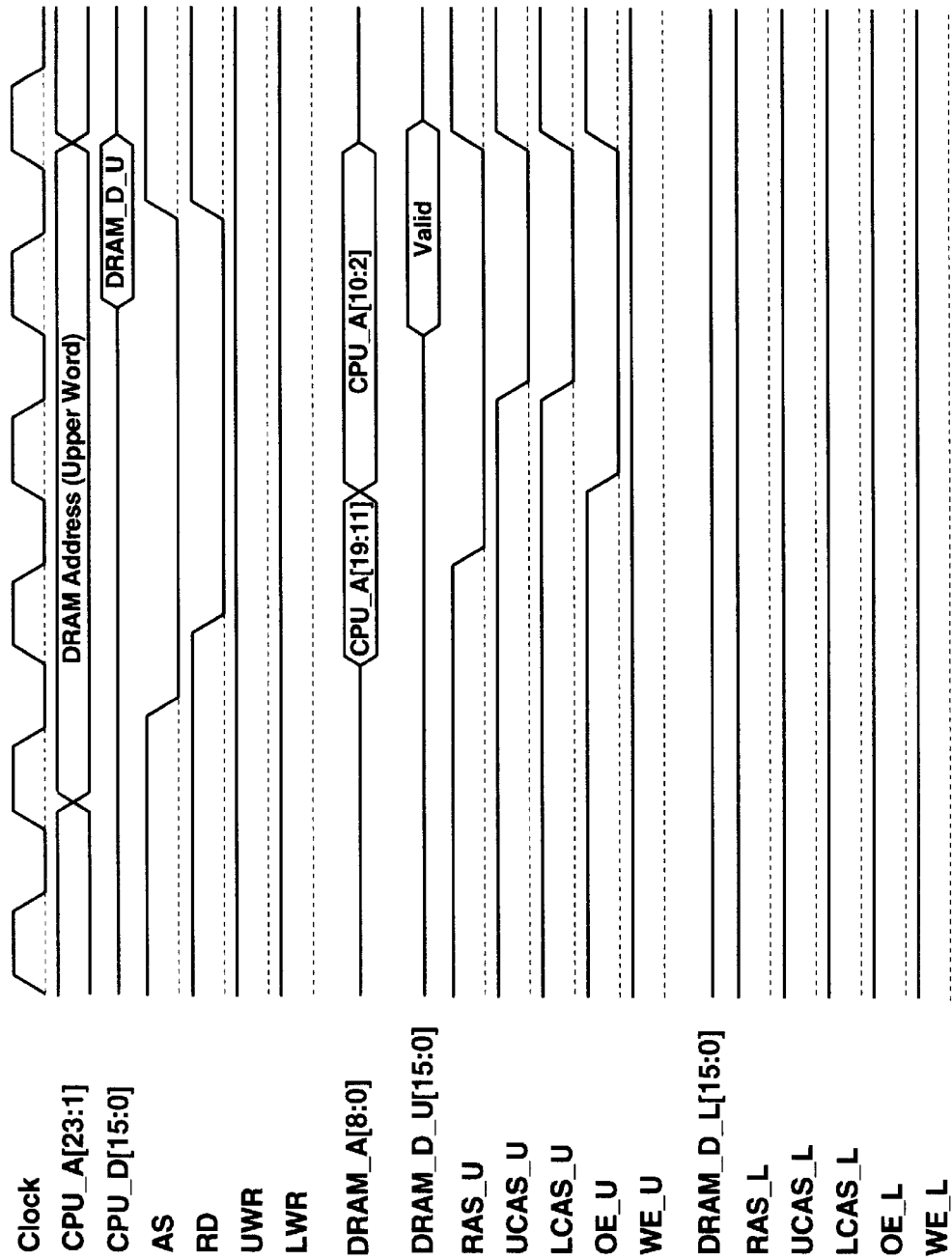
FIG. 19 is a timing chart for reading an upper word in the bus arbiter shown in FIG. 15.
Figure 20:
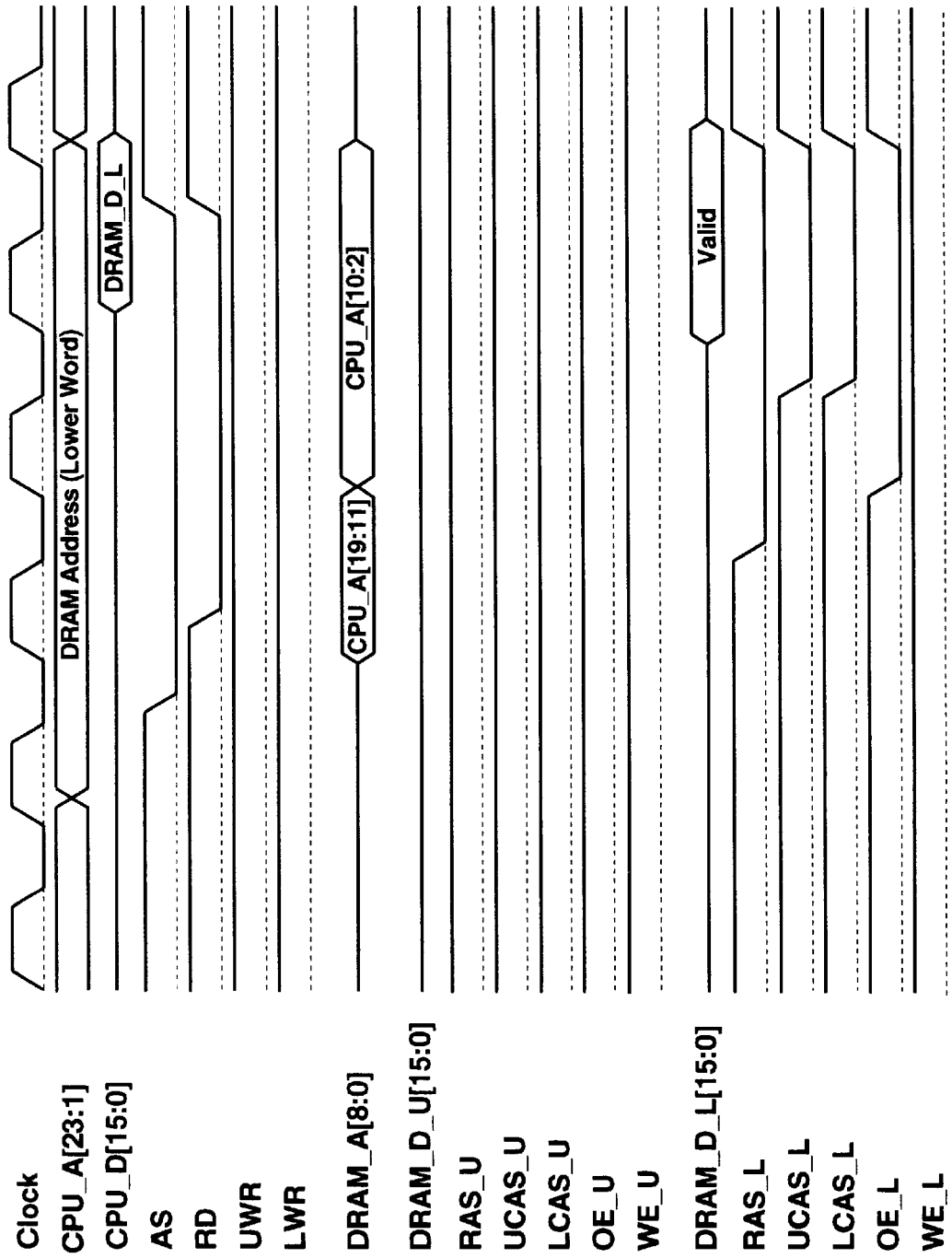
FIG. 20 is a timing chart for reading a lower word corresponding to the upper word shown in FIG. 19.
Figure 21:
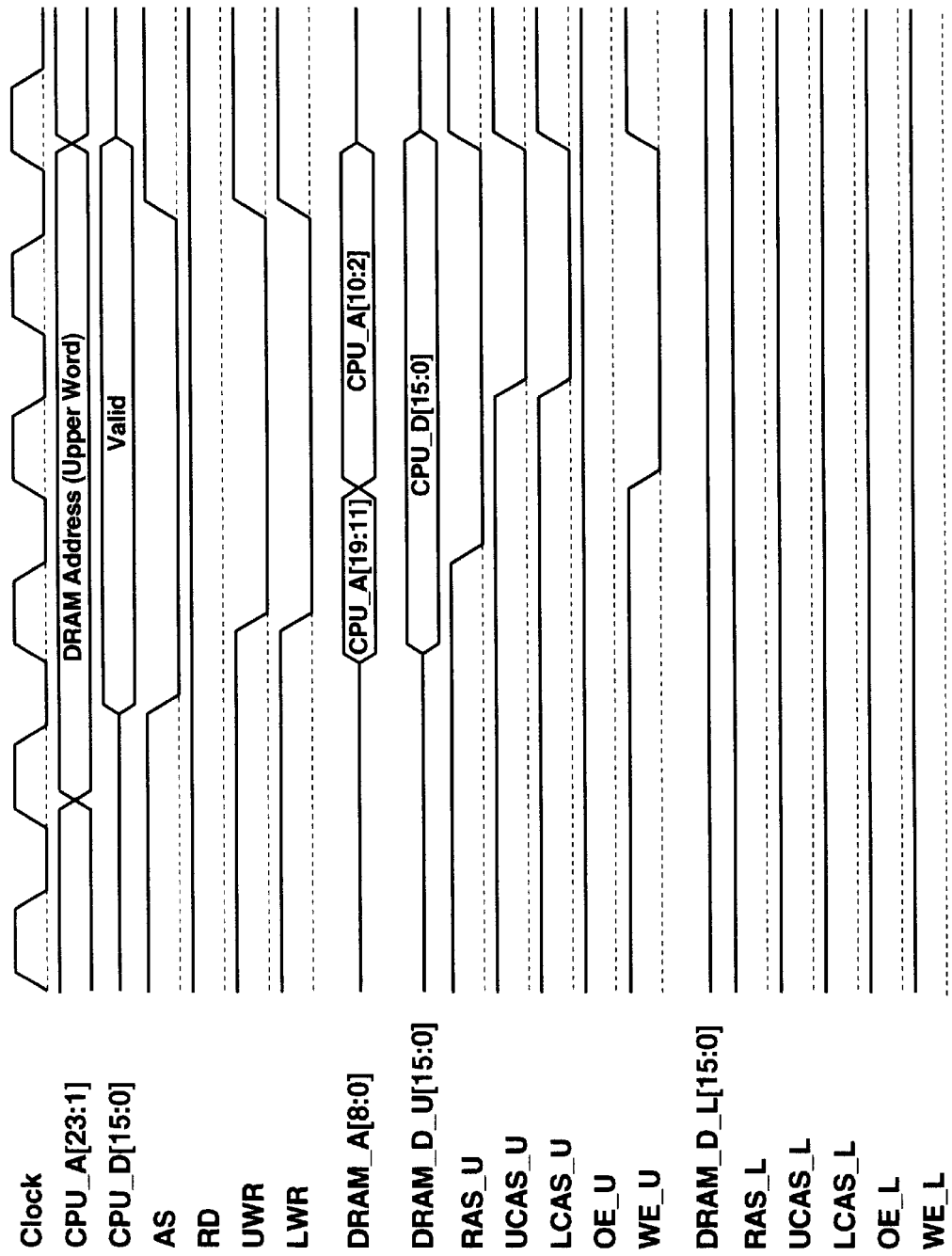
FIG. 21 is a timing chart for writing an upper word in he bus arbiter shown in FIG. 15.
Figure 22:
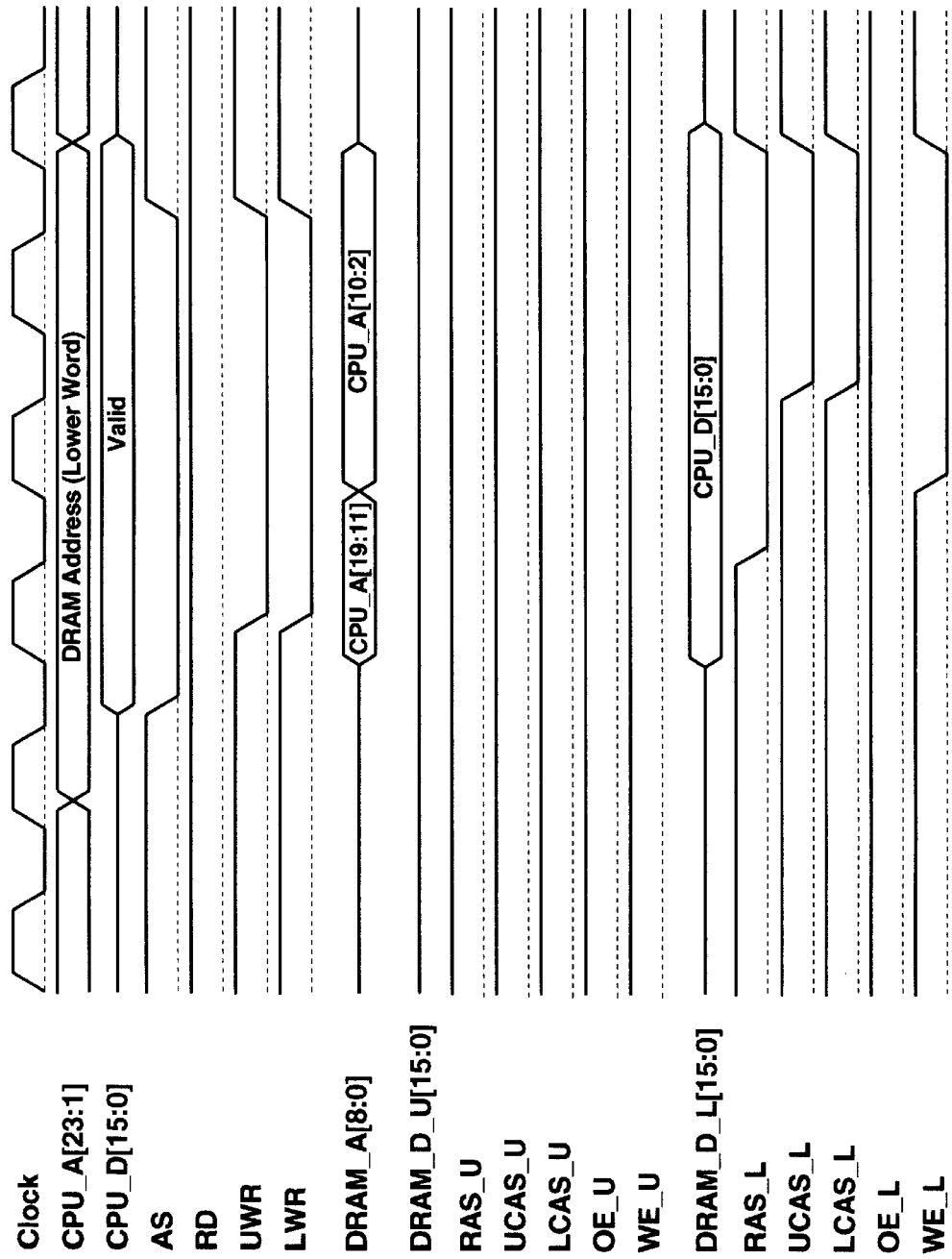
FIG. 22 is a timing chart for writing a lower word corresponding to the upper word shown in FIG. 21.
Figure 23:
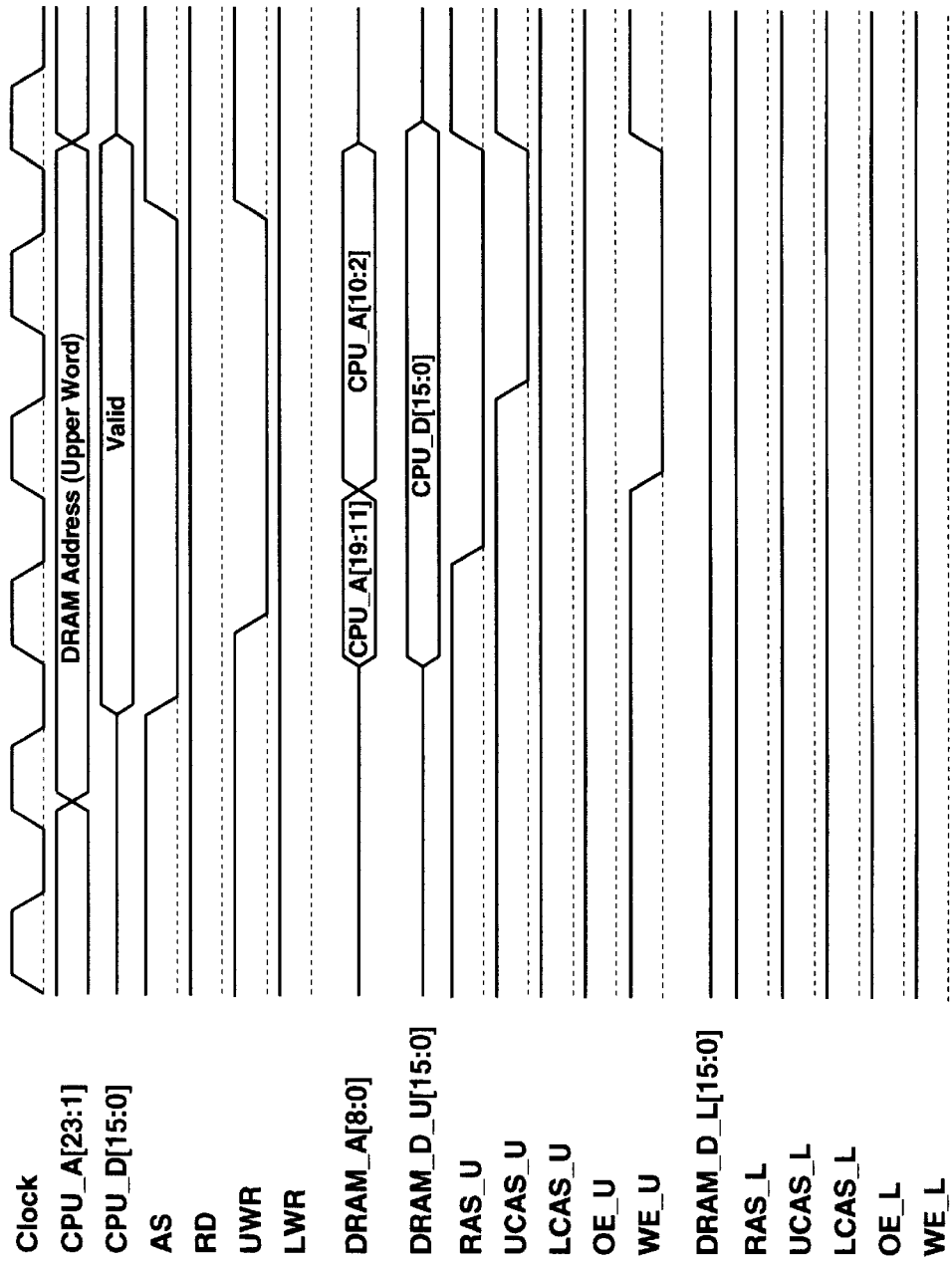
FIG. 23 is a timing chart for writing an upper byte of an upper word in the bus arbiter shown in FIG. 15.
Figure 24:
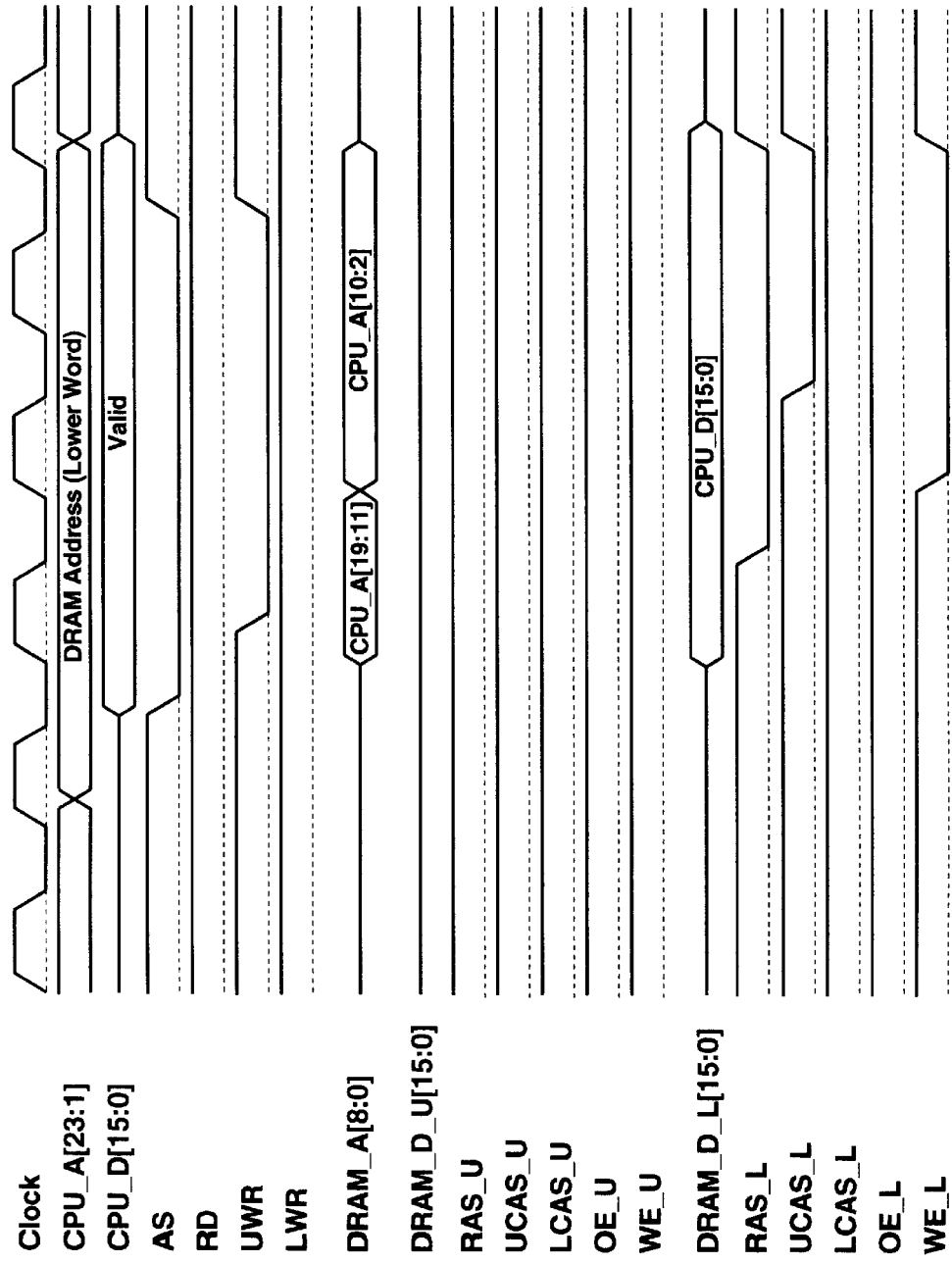
FIG. 24 is a timing chart for writing an upper byte of a lower word corresponding to the upper word shown in FIG. 23.
Figure 25:
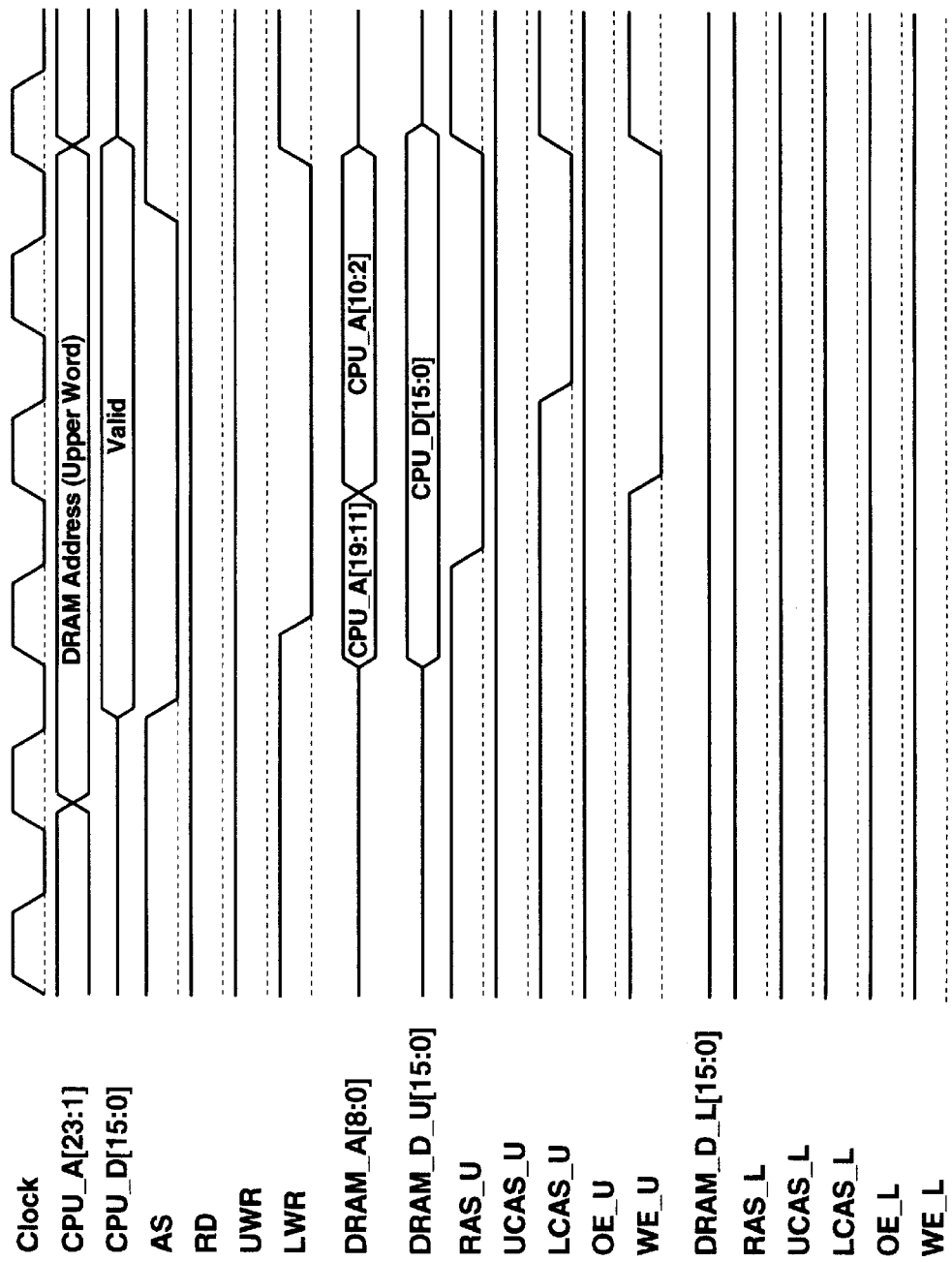
FIG. 25 is a timing chart for writing a lower byte of an upper word in the bus arbiter shown in FIG. 15.

FIG. 4 is a flowchart illustrating the operation of a bus arbiter (also operating as a DRAM controller) 500 during an access by the CPU 300. First, the rise of a clock pulse is detected (step S101). Then, it is determined if the addresses 0H—7FFFFFH of the region of the ROM 400 (see FIG. 14) are indicated by upper bits on the bus CPU_A [23:1] (step S102). If the result of the determination is affirmative, CAS Before RAS refreshing is performed as in the conventional approach shown in FIG. 16 (step S103).

If the result of the determination in step S102 is negative, the process proceeds to step S104, where it is determined if addresses 800000H—8FFFFFH of the RAM region are indicated. If the result of the determination in step S104 is affirmative, the process proceeds to step S105, where a signal CPU_A[19:10] is output to the bus DRAM_A[8:0] as a row address.

Then, the fall of a clock pulse is detected (step S106). Then, it is determined whether a signal CPU_A[1] assumes 0 or 1, i.e., whether the DRAM 600 for upper words or the DRAM 700 for lower words is to be accessed (step S107). In the case of an access to an upper word, a signal RAS_U is asserted (step S108), and at the same time, signals UCAS_L and LCAS_L of the DRAM 700 for storing lower words which is not accessed are asserted as a refreshing operation (step S201).

In the case of an access to a lower word as the result of the determination in step S107, a signal RAS_L is asserted (step S109), and, at the same time, signals UCAS_U and LCAS_U of the DRAM 600 which is not accessed are asserted (step S202).

Then, the rise of a clock pulse is detected (step S110 or S111), and it is determined if the access relates to a reading operation or a writing operation (step S112 or S113). In the case of a reading operation and an upper word, a signal OE_U is asserted (step S116). In the case of a reading operation and a lower word, a signal OE_L is asserted (step S117).

In the case of a writing operation and an upper word, a signal WE_U is asserted (step S114). In the case of a writing operation and a lower word, a signal WE_L is asserted (step S115).

At the same time, a signal CPU_A [9:2] is output to the bus DRAM_A [8:0] as a column address (step S118 or S119). Then, the rise of a clock pulse is detected (step S120 or S121). Then, it is determined if the access relates to a reading operation (step S122 or S123). In the case of a reading operation and an upper word, signals UCAS_U and LCAS_U are asserted (step S124), and at the same time, a signal RAS_L of the DRAM 700 which is not accessed is asserted as a refreshing operation (step S203).

In the case of a reading operation and a lower word, signals UCAS_L and LCAS_L are asserted (step S125), and, at the same time, a signal RAS_U of the DRAM 600 is asserted as a refreshing operation (step S204).

If the result of the determination in step S122 or S123 is negative, it is then determined if the access relates to an operation of writing an upper byte (step S126 or S127). In the case of an operation of writing an upper byte, the signal UCAS_U is asserted in the case of an upper word (step S128), and the signal UCAS_L is asserted in the case of a lower word (step S129). Similarly, it is determined if the access relates to an operation of writing a lower byte (step S130). If the result of the determination in step S130 is affirmative, the process proceeds to step S132, where the signal LCAS_U is asserted in the case of an upper word (step S132). At the same time, a signal RAS_L of the DRAM 600 is asserted as a refreshing operation (step S203).

In the case of a lower word, the signal LCAS_L is asserted (step S133), and at the same time, a signal RAS_U of the DRAM 700 is asserted as a refreshing operation (step S204).

Then, the rise, the fall, and the rise of clock pulses are detected (steps S134, S135 and S136). Finally, all of the signals RAS_U, RAS_L, UCAS_U, LCAS_U, UCAS_L, LCAS_L, OE_U, OE_L, WE_U and WE_L are negated, and the series of processing is terminated (step S137).

In the above-described sequence, by asserting the signals UCAS_L and LCAS_L in step S201, asserting the signal RAS_L in step S203, asserting the signals UCAS_U and LCAS_U in step S202, and asserting the signal RAS_U in step S204, CAS Before RAS refreshing of the DRAM which is not accessed is performed.

Such refreshing operations will now be described with reference to the timing charts shown in FIGS. 5 through 12. Since FIG. 5 illustrates an operation of reading an upper word, a refreshing operation is performed while the signals RD, RAS_U, UCAS_U, LCAS_U and OE_U are asserted, the DRAM 600 is accessed, and the signals RAS_L, UCAS_L and LCAS_L of the DRAM 700 are asserted.

Since FIG. 6 illustrates an operation of reading a lower word, a refreshing operation is performed while the signals RD, RAS_L, UCAS_L, LCAS_L and OE_L are asserted, the DRAM 700 is accessed, and the signal RAS_U and the succeeding signals of the DRAM 600 are asserted.

Since FIG. 7 illustrates an operation of writing an upper word, a refreshing operation is performed while the signals UWR, LWR, RAS_U, UCAS_U, LCAS_U and WE_U are asserted, the DRAM 600 is accessed, and the signals RAS_L, UCAS_L and LCAS_L are asserted.

Since FIG. 8 illustrates an operation of writing a lower word, a refreshing operation is performed while the signals RAS_L, UCAS_L, LCAS_L and WE_L are asserted, the DRAM is accessed, and the signal RAS_U and the succeeding signals of the DRAM 600 are asserted.

Each of FIGS. 9 through 12 illustrates a state in which, while a writing operation is performed for one of the DRAM's, the other DRAM is refreshed.

As described above, according to the fifth embodiment, CAS Before RAS refreshing in steps S201–203, and S202–S204 is performed in addition to a conventional refreshing operation in step S103 without interrupting the operation of the system, the throughput of the system increases.

Correspondence Between the Following Claims and the Foregoing Embodiments

The determination means of the present invention corresponds to the processing of step S103 shown in FIG. 1. The processing means corresponds to the processing of step S105.

The arbitration means corresponds to the processing of steps S201–S204 shown in FIG. 4.

Other Embodiments

Although the present invention has been described illustrating separately the first through fifth embodiments, the present invention may, of course, be applied to a case in which all or a part of the functions of these several embodiments are provided in the same system.

Although, in the first through fourth embodiments, a single DRAM is illustrated in the One-By-One DMA Mode, the present invention is not limited to such a case. For example, the present invention may be applied to a case in which a plurality of memories, controllers and the like are present, and various types of procedures for arbitrating the priority order of a bus arbiter are used.

Although in the fifth embodiment, ordinary CAS-Before-RAS refreshing is performed as refreshing, the present invention may also be applied to a combination of high-speed refreshing and low-power refreshing for the purpose of low power consumption in a portable system or the like.

As described above, it is possible to reduce the circuit scale within a system by providing a bus arbiter with a function such that an apparatus for generating an address behaves as if a normal memory access were performed for a request to set an address outside a set address region where a corresponding device is absent with a simple configuration, so that a function of prohibiting a request to set an address outside the set address region which has been necessary for the apparatus for generating an address can be omitted.

Furthermore, since a selection means for selecting setting of an address outside a set address region when performing a writing or reading operation only for a register, operates by virtue of arranging that an apparatus for generating an address can select setting of an address within the set address region or setting of an address outside the set address region, it is possible to process data in a register that does not need an address in the same sequence as when the apparatus for generating an address accesses data of a DRAM.

In addition, since a CPU RESET command, serving as a CPU command, is transmitted in response to a request of a reading operation from an address outside a set address region where a corresponding device is absent, it is possible to prevent a runaway of a system and to protect the system by transmitting the CPU RESET command when there is a possibility of occurrence of abnormality in the system.

Moreover, since a DRAM which is not accessed by a CPU is refreshed by asserting CAS and RAS signals when RAS and CAS signals of a DRAM which is accessed by the CPU are asserted, an operation of refreshing the DRAM by temporarily interrupting processing by the CPU forcedly becomes unnecessary, so that the efficiency of use of the CPU can be improved.

The individual components designated by blocks in the drawings are all well-known in the bus arbiter arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A bus arbiter, which is connected to a CPU via a CPU data bus and a CPU address bus, a DMA (direct memory access) controller via a DMA data bus and a DMA address bus, and at least two DRAMs via a DRAM address bus and respective DRAM DATA buses, and the CPU being connected to a ROM via the CPU data bus and the CPU address bus, said bus arbiter comprising:

arbitration means for arbitrating access requests to the DRAMs from the CPU and the DMA controller so as to allow one of the access requests;

check means for checking a value of a predetermined bit portion in an address of each access request transmitted via the CPU address bus or the DMA address bus;

determination means for determining whether the address of the access request falls within an address area of a first one of the DRAMs or an address area of the ROM based on the value checked by said check means; and control means for accessing to the first one of the DRAMs and refreshing a second one of the DRAMs, simultaneously, when said determination means determines the address of the access request falls within the address area of the first one of the DRAMs, and refreshing all the DRAMs while the CPU accesses to the ROM when said determination means determines the address of the access request falls within the address area of the ROM.

2. A bus arbiter according to claim 1, wherein, when said determination means determines the address of the access request falls within the address area of the first one of the DRAMs, said control means asserts a first RAS signal for the first one of the DRAMs to be accessed and a second CAS signal for the second one of the DRAMs to be refreshed, concurrently, and asserts a first CAS signal for the first one of the DRAMs to be accessed and a second RAS signal for the second one of the DRAMs to be refreshed, concurrently, after asserting the first RAS signal and the second CAS signal.

3. A bus arbiter according to claim 2, wherein said control means performs a discrimination as to whether the access request is a read request or a write request, and asserts an output enable signal or a write enable signal to the first one of the DRAMs in accordance with the result of the discrimination.

4. A bus arbiter according to claim 3, wherein the discrimination and the assertion of the output enable signal or the write enable signal are performed after asserting the first RAS signal and the second CAS signal, and before asserting the second RAS signal and the first CAS signal.

5. A bus arbiter according to claim 1, wherein the DMA data bus has a bus width equal to n times a bus width of the CPU data bus.

6. A bus arbiter according to claim 1, wherein the number of the DRAMs is two.

7. An information processing system comprising:

a bus arbiter;

a CPU which is connected to said bus arbiter via a CPU data bus and a CPU address bus;

a ROM which is connected to said CPU via the CPU data bus and the CPU address bus;

a DMA (direct memory access) controller which is connected to said bus arbiter via a DMA data bus and a DMA address bus; and at least two DRAMS which is connected to said bus arbiter via a DRAM address bus and respective DRAM data buses, said bus arbiter including:

arbitration means for arbitrating access requests to said DRAMs from said CPU and said DMA controller so as to allow one of the access;

check means for checking a value of a predetermined bit portion in an address of each access request transmitted via the CPU address bus or the DMA address bus;

determination means for determining whether the address of the access request falls within an address area of a first one of said DRAMs or an address area of the ROM based on the value checked by said check means; and control means for accessing to the first one of said DRAMs and refreshing a second one of said DRAMs, simultaneously, when said determination means determines the address of the access request falls within the address area of the first one of said DRAMs, and refreshing all the DRAMs while the CPU accesses to the ROM when said determination means determines the address of the access request falls within the address area of the ROM.

* * * * *

UNITED STATES PATENT AND TRADEMARK OFFICE
CERTIFICATE OF CORRECTION

PATENT NO.    : 6,070,212
DATED         : May 30, 2000
INVENTOR(S)   : MIDORI YASUDA ET AL

Page 1 of 2

It is certified that error appears in the above-identified patent and that said Letters Patent is hereby corrected as shown below:

ON THE TITLE PAGE [56] References Cited

OTHER PUBLICATIONS, "Billetin," should read --Bulletin,--.

COLUMN 1:

Line 63, "DMAA" should read --DMA_A--.

COLUMN 2:

Line 35, "UCAS U, LCAS U, UCAS L" should read --UCAS_U, LCAS_U, UCAS_L--; and
    Line 53, "CPU A" should read --CPU_A-- and "DRAM A" should read --DRAM_A--.

COLUMN 3:

Line 28, "RAS U, RAS L, UCAS U," should read --RAS_U, RAS_L, UCAS_U,--; and
    Line 35, ""DMA A" should read --DMA_A-- and "DMA Dir" should read --DMA_Dir--.

COLUMN 4:

Line 33, "an" should read --for an--.

UNITED STATES PATENT AND TRADEMARK OFFICE
CERTIFICATE OF CORRECTION

PATENT NO. : 6,070,212
DATED : May 30, 2000
INVENTOR(S) : MIDORI YASUDA ET AL

Page 2 of 2

It is certified that error appears in the above-identified patent and that said Letters Patent is hereby corrected as shown below:

COLUMN 7:

Line 33, "DMA Ack" should read --DMA_Ack--.

COLUMN 8:

Line 2, "DMA Ack" should read --DMA_Ack--.

COLUMN 9:

Line 21, "procesures," should read --procedures--.

COLUMN 14:

Line 11, "is" should read --are--; and
    Line 17, "one of the access;" should read --one of the access requests;--.

Signed and Sealed this

Twenty-fourth Day of April, 2001

Attest:

NICHOLAS P. GODICI

*Attesting Officer*      *Acting Director of the United States Patent and Trademark Office*